US011049351B2

(12) United States Patent
Toyoda

(10) Patent No.: US 11,049,351 B2
(45) Date of Patent: Jun. 29, 2021

(54) MONEY HANDLING MACHINE AND MONEY HANDLING SYSTEM

(71) Applicant: GLORY LTD., Hyogo (JP)

(72) Inventor: Yasutaka Toyoda, Hyogo (JP)

(73) Assignee: GLORY LTD., Hyogo (JP)

( * ) Notice: Subject to any disclaimer, the term of this patent is extended or adjusted under 35 U.S.C. 154(b) by 0 days.

(21) Appl. No.: 16/230,125

(22) Filed: Dec. 21, 2018

(65) Prior Publication Data

US 2019/0197812 A1 Jun. 27, 2019

(30) Foreign Application Priority Data

Dec. 27, 2017 (JP) ............................. JP2017-250401

(51) Int. Cl.

| | |
|---|---|
| ***G06F 19/00*** | (2018.01) |
| ***G07D 11/14*** | (2019.01) |
| ***G07D 11/30*** | (2019.01) |
| ***G07D 11/245*** | (2019.01) |

(52) U.S. Cl.

CPC ........... *G07D 11/14* (2019.01); *G07D 11/245* (2019.01); *G07D 11/30* (2019.01)

(58) Field of Classification Search

CPC ..... G06Q 20/1085; G06Q 11/00; G06Q 11/13
USPC ......................................... 235/379, 380, 383
See application file for complete search history.

(56) References Cited

U.S. PATENT DOCUMENTS 6,170,822 B1 * 1/2001 Kato .................... B65H 29/006 271/298
2012/0012437 A1 * 1/2012 Matsumoto .............. G07D 9/00 194/342
2014/0069770 A1 * 3/2014 Nomura .................... G07F 7/04 194/206
2014/0072696 A1 * 3/2014 Nomura ............... G07D 11/125 427/7
2014/0080395 A1 * 3/2014 Takeuchi ................. G07D 1/00 453/3
2017/0140597 A1 * 5/2017 Takami .................... G07D 1/02

FOREIGN PATENT DOCUMENTS

EP 2410497 * 1/2012 ............... G07D 1/02
EP 2555172 A1 2/2013
JP 2017-97405 A 6/2017
WO 2017/086093 A1 5/2017

OTHER PUBLICATIONS

European Search Report, European Patent Office, Patent Application No. 18213986.5, dated Jun. 6, 2019.
Communication pursuant to Article 94(3) EPC dated Oct. 9, 2020 issued in European patent application No. 18213986.5-1009.

* cited by examiner

*Primary Examiner* — Daniel St Cyr
(74) *Attorney, Agent, or Firm* — Greenblum & Bernstein, P.L.C.

(57) ABSTRACT

A money handling machine includes: a storage assembly including a storage unit for storing money and feeding out the stored money; a collection unit configured to store the money fed out from the storage unit; a replenishing unit configured to store money with which an external device is replenished; and a control unit configured to manage the money stored in the storage unit of the storage assembly under a first management authority, and manage money stored in the collection unit and at least a part of money stored in the replenishing unit under a second management authority.

12 Claims, 17 Drawing Sheets

MONEY HANDLING MACHINE AND MONEY HANDLING SYSTEM

CROSS-REFERENCE TO RELATED APPLICATION

This application claims priority to Japanese Patent Application No. 2017-250401 filed on Dec. 27, 2017, the entire contents of which are incorporated herein by reference.

BACKGROUND OF THE INVENTION

1. Field of the Invention

The present invention relates to a money handling machine for performing handling of money and a money handling system including such a money handling machine.

2. Description of the Related Art

In stores of commercial facilities such as supermarkets and convenience stores, a money change machine is installed in a settlement place in a front office region where store shelves are arranged, and a money depositing and dispensing machine is installed in a back office region which customers are not allowed to enter. Furthermore, the money depositing and dispensing machine installed in the back office region performs depositing of money collected from the money change machine as proceeds from sales, and performs dispensing of money with which the money change machine is to be replenished as change replenishment money from a replenishing unit arranged in the money depositing and dispensing machine.

To date, various types of money handling systems in each of which a money change machine installed in the front office region and a money depositing and dispensing machine installed in the back office region are combined with each other, have been used. For example, Japanese Laid-Open Patent Publication No. 2017-97405 discloses a money management system in which information on coin rolls that are dispensed from a money depositing and dispensing machine installed in a back office region can be managed by a money change machine installed in a front office region, and the information on the coin rolls as change replenishment money with which the money change machine is to be replenished, can be thus managed by the money change machine.

The money handling system in which a money change machine installed in a front office region and a money depositing and dispensing machine installed in a back office region are combined with each other, is used such that a guard of a cash-in-transit company delivers money as change fund to the store every day, and a clerk or the like of the store receives the money from the guard, and the clerk then deposits the money into the money depositing and dispensing machine. The guard of the cash-in-transit company collects money as proceeds from sales, from the money depositing and dispensing machine. Thereafter, a monetary amount of money as the change fund received from the guard by the clerk or the like of the store is deposited from the store into the account of the cash-in-transit company.

SUMMARY OF THE INVENTION

In the conventional money handling system disclosed in Japanese Laid-Open Patent Publication No. 2017-97405, the money depositing and dispensing machine installed in the back office region has a coin roll storage assembly in which coin rolls are stored. In the conventional money handling system, such a coin roll storage assembly is managed under management authority of the store, and the clerk of the store has the management authority of the store but the guard of the cash-in-transit company does not have the management authority of the store. Therefore, a problem arises that a guard of a cash-in-transit company cannot store coin rolls among money delivered as the change fund to the store directly in the coin roll storage assembly, and, when a clerk of the store is absent, the guard cannot deliver the change fund that includes the coin rolls. The reason is that the clerk of the store having the management authority of the store can access money stored in the coin roll storage assembly but the guard of the cash-in-transit company not having the management authority of the store cannot access money stored in the coin roll assembly.

The present invention has been made in view of such circumstances, and an object of the present invention is to provide a money handling system including a money handling machine which has a replenishing unit and a storage assembly such that management authority for the replenishing unit that stores money with which an external device is to be replenished is different from management authority for the storage assembly in the money handling system, and, even when a clerk of a store is absent, money as change fund can be delivered.

A money handling machine of the present invention includes: a storage assembly including a storage unit for storing money and feeding out the stored money; a collection unit configured to store the money fed out from the storage unit; a replenishing unit configured to store money with which an external device is replenished; and a control unit configured to manage the money stored in the storage unit of the storage assembly under a first management authority, and manage money stored in the collection unit and at least a part of money stored in the replenishing unit under a second management authority different from the first management authority.

In the money handling machine of the present invention, the first management authority may be a management authority of a facility in which the money handling machine is installed, and the second management authority may be a management authority of an organization that collects money from the collection unit.

In the money handling machine of the present invention, when the money stored in the storage assembly is fed out from the storage assembly to the collection unit, the control unit may control the storage assembly and the replenishing unit so as to feed out the money stored in the storage assembly from the storage assembly to the collection unit and allow the money stored in the replenishing unit to be take out from the replenishing unit.

In this case, when the money stored in the storage assembly is fed out from the storage assembly to the collection unit, the control unit may control the storage assembly so as to send to the collection unit, the money fed out from the storage unit of the storage assembly.

Alternatively, the storage assembly may include an inlet unit configured to take in money into the storage assembly; and when the money stored in the storage assembly is fed out from the storage assembly to the collection unit, the control unit may control the storage assembly so as to send, to the collection unit, the money taken in into the storage assembly by the inlet unit.

Alternatively, the storage assembly may include a cassette mounting unit to which a storage cassette for storing money and feeding out the stored money, is mounted; and when money is fed out from the storage assembly to the collection unit, the control unit may control the storage assembly so as to send, to the collection unit, the money fed out from the storage cassette mounted to the cassette mounting unit, into the storage assembly.

The money handling machine of the present invention may further include a detection unit configured to detect a monetary amount of money taken out from the replenishing unit, and when money is fed out from the storage assembly to the collection unit, the control unit may compare a monetary amount of money fed out from the storage assembly to the collection unit, and a monetary amount of money detected by the detection unit, with each other.

In this case, the money handling machine of the present invention may further include a notification unit configured to make notification that a monetary amount of money sent from the storage assembly to the collection unit, and a monetary amount of money detected by the detection unit are not the same.

Further, the money handling machine of the present invention may further include a locking mechanism configured to lock the replenishing unit into a housing, and when a monetary amount of money sent from the storage assembly to the collection unit, and a monetary amount of money detected by the detection unit are not the same, the control unit may control the locking mechanism so as to prevent the replenishing unit from being locked by the locking mechanism.

In the money handling machine of the present invention, the replenishing unit may be configured to store at least coin rolls.

A money handling system of the present invention includes: a money handling machine configured to include a storage assembly including a storage unit for storing money and feeding out the stored money, and a collection unit configured to store the money fed out from the storage unit; a replenishing unit, disposed separately from the money handling machine, configured to store money with which an external device is replenished; and a control unit configured to manage the money stored in the storage unit of the storage assembly in the money handling machine under a first management authority, and manage money stored in the collection unit of the money handling machine, and at least a part of money stored in the replenishing unit, under a second management authority different from the first management authority.

DESCRIPTION OF THE PREFERRED EMBODIMENTS

Figure 1:
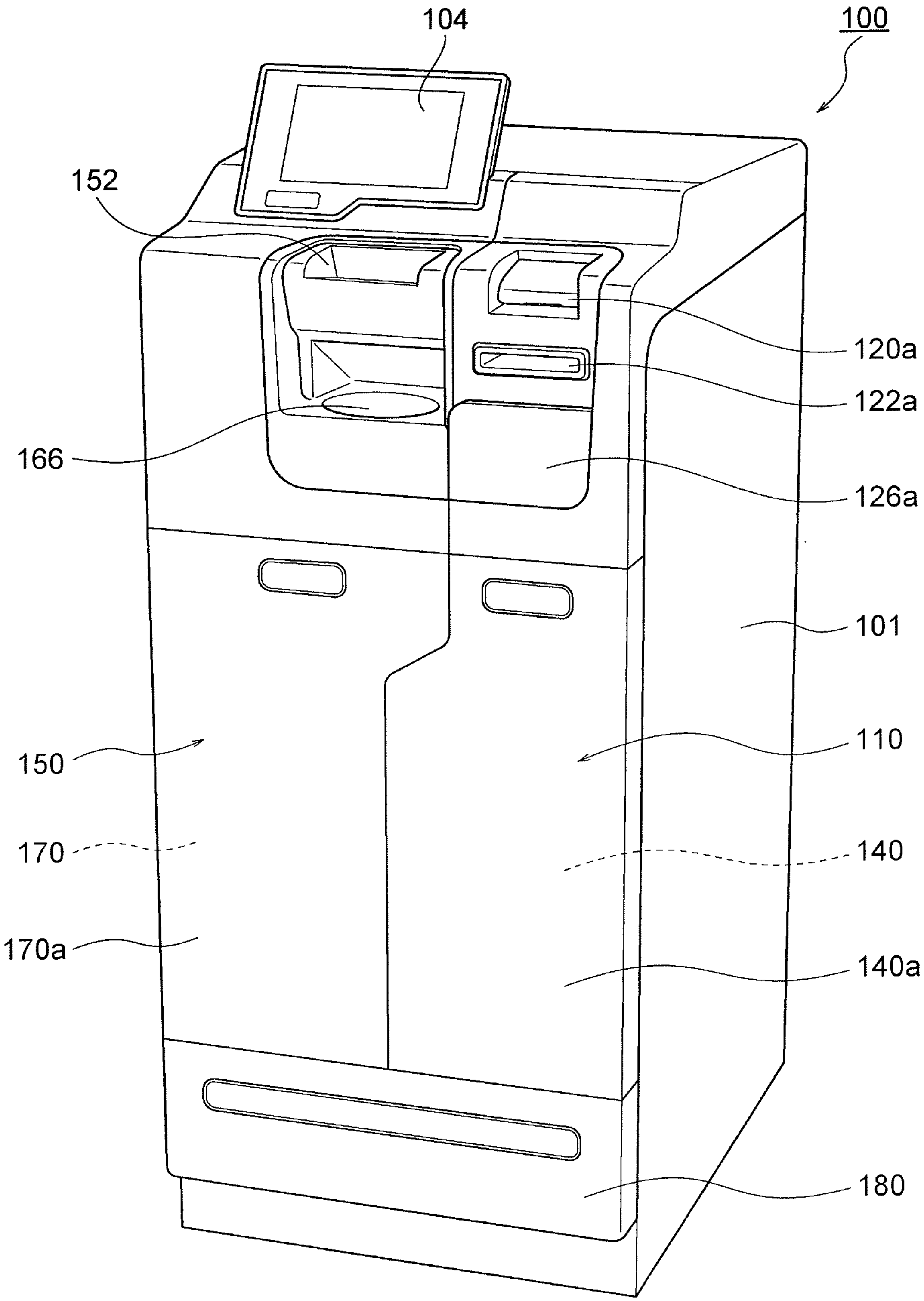
FIG. 1 is a perspective view of an outer appearance of a money depositing and dispensing machine according to an embodiment of the present invention.
Figure 2:
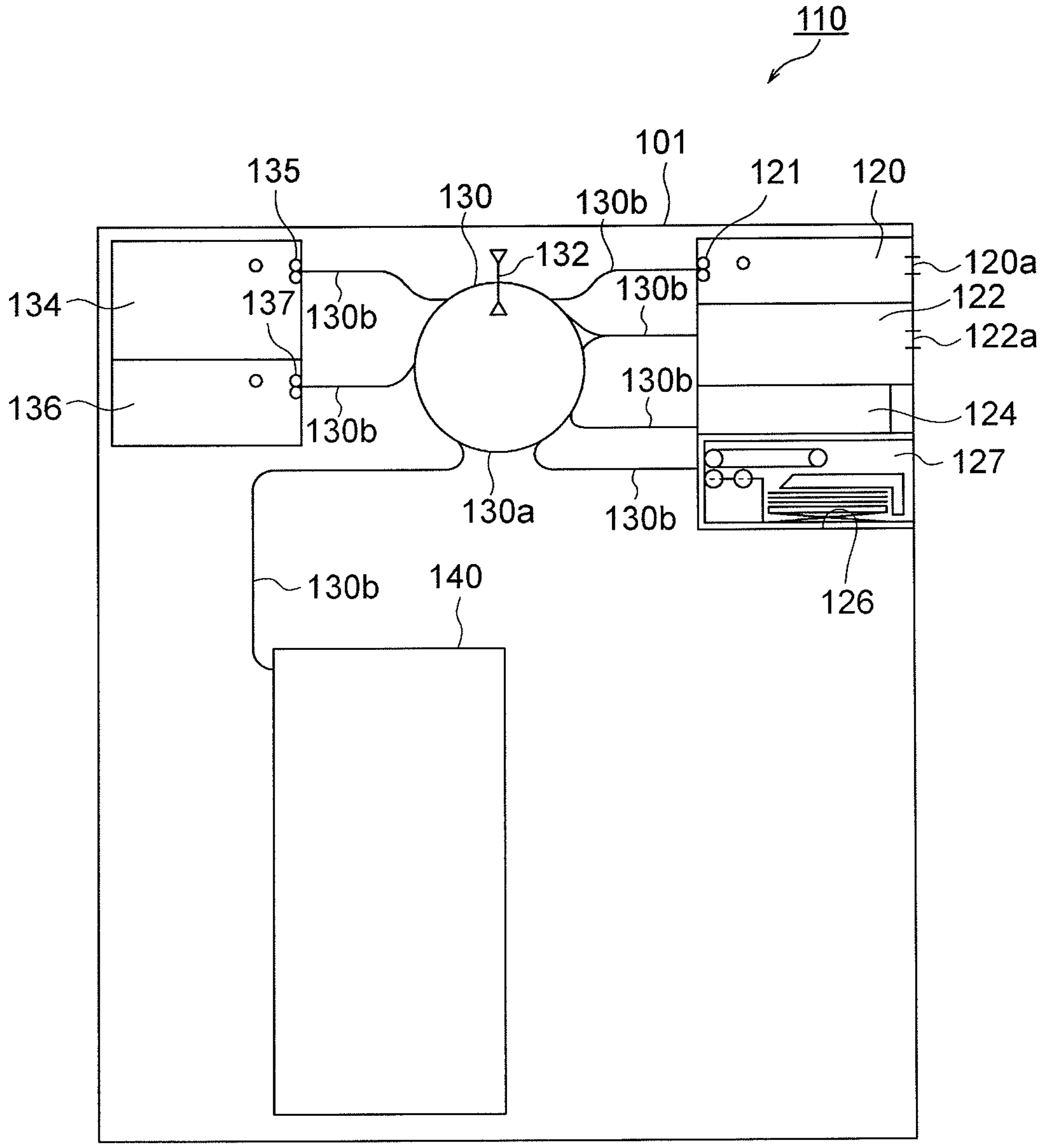
FIG. 2 illustrates an internal structure of a banknote handling assembly of the money depositing and dispensing machine shown in FIG. 1, as viewed from the lateral side thereof.
Figure 3:
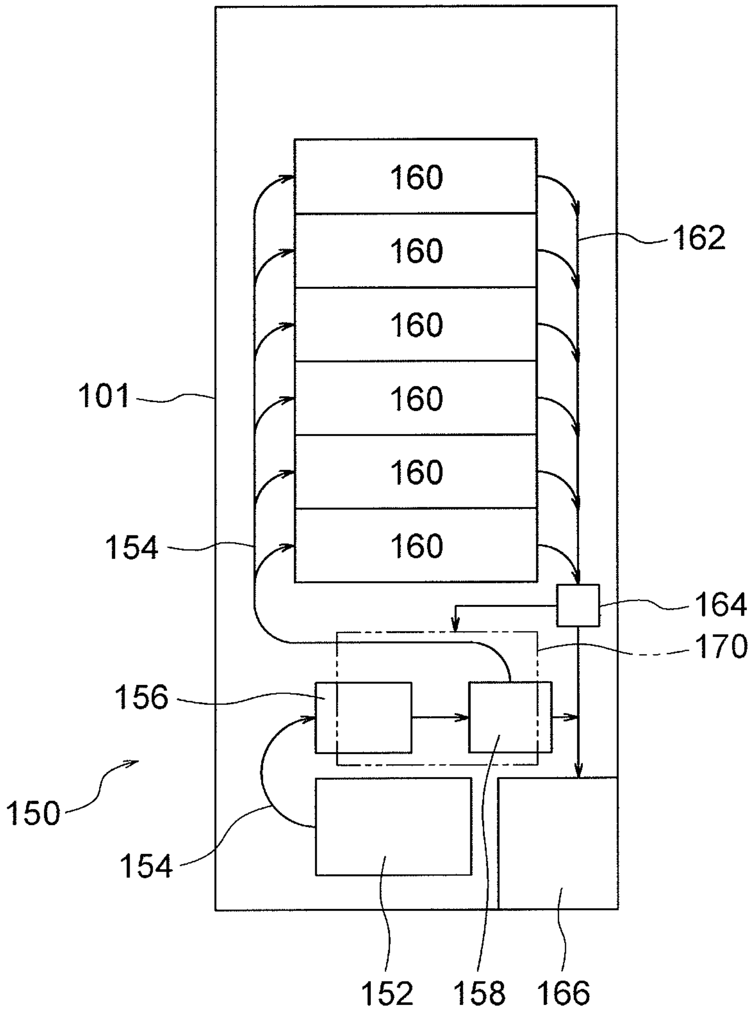
FIG. 3 illustrates an internal structure of a coin handling assembly of the money depositing and dispensing machine shown in FIG. 1, as viewed from thereabove.
Figure 4:
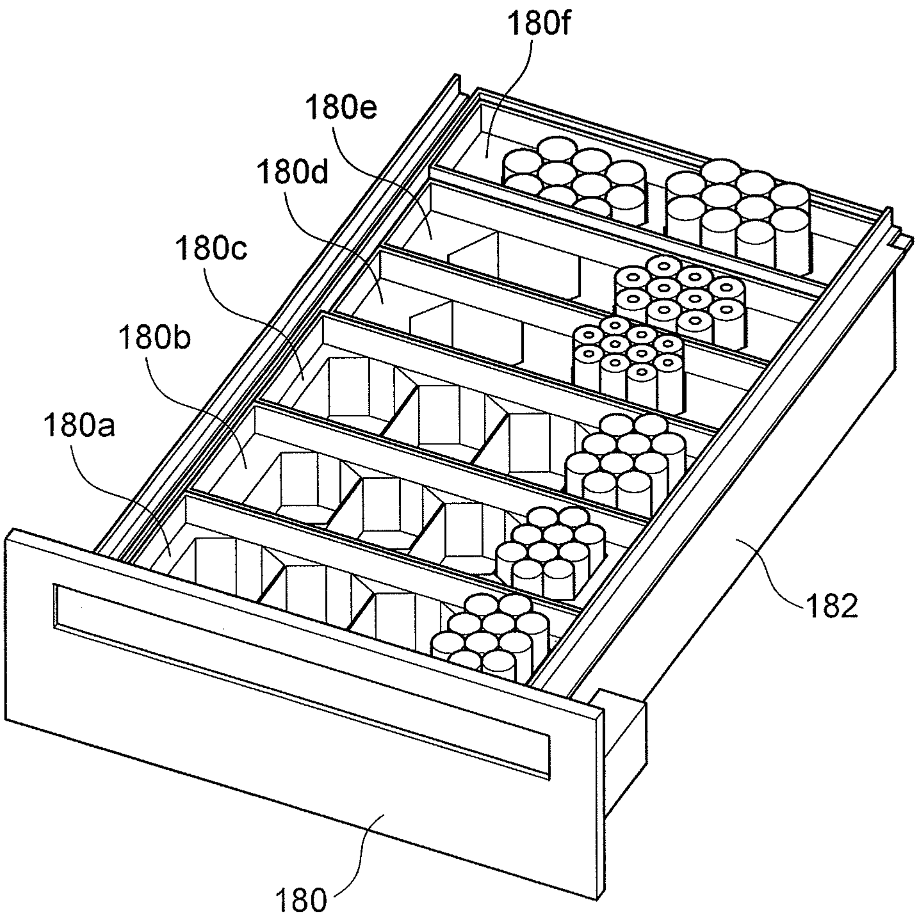
FIG. 4 is a perspective view of a structure of a storage drawer of a coin roll storage assembly of the money depositing and dispensing machine shown in FIG. 1.
Figure 5:
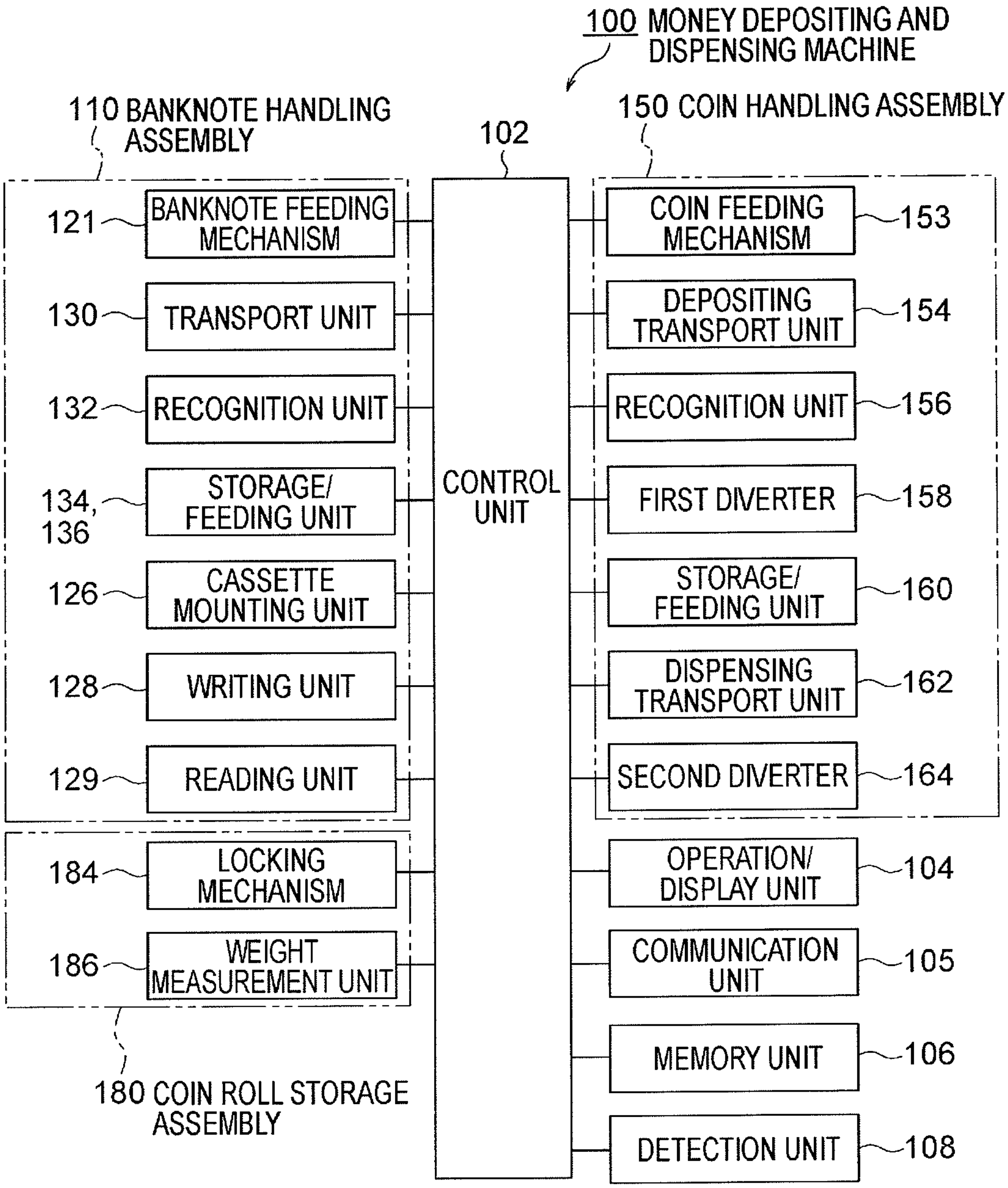
FIG. 5 is a functional block diagram illustrating a configuration of a control system of the money depositing and dispensing machine shown in FIG. 1.
Figure 6:
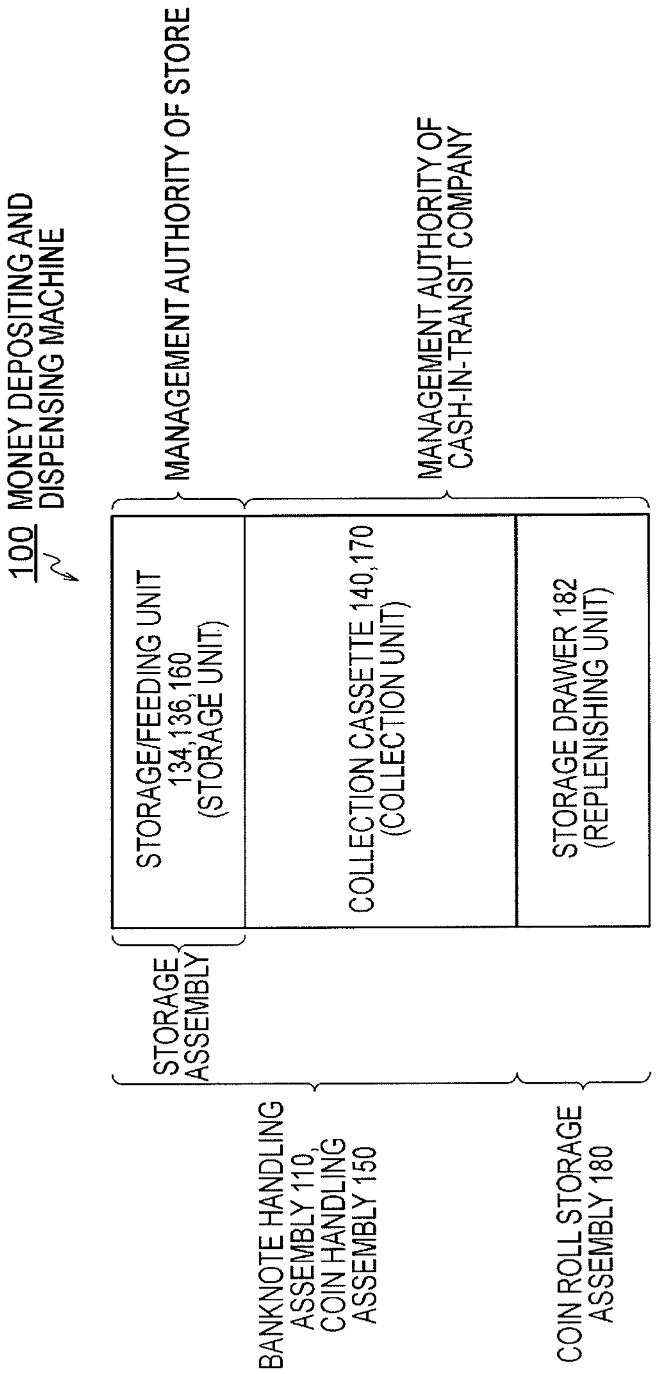
FIG. 6 illustrates management authority for each of a storage assembly, a collection cassette, and a storage drawer of the money depositing and dispensing machine shown in FIG. 1.
Figure 7:
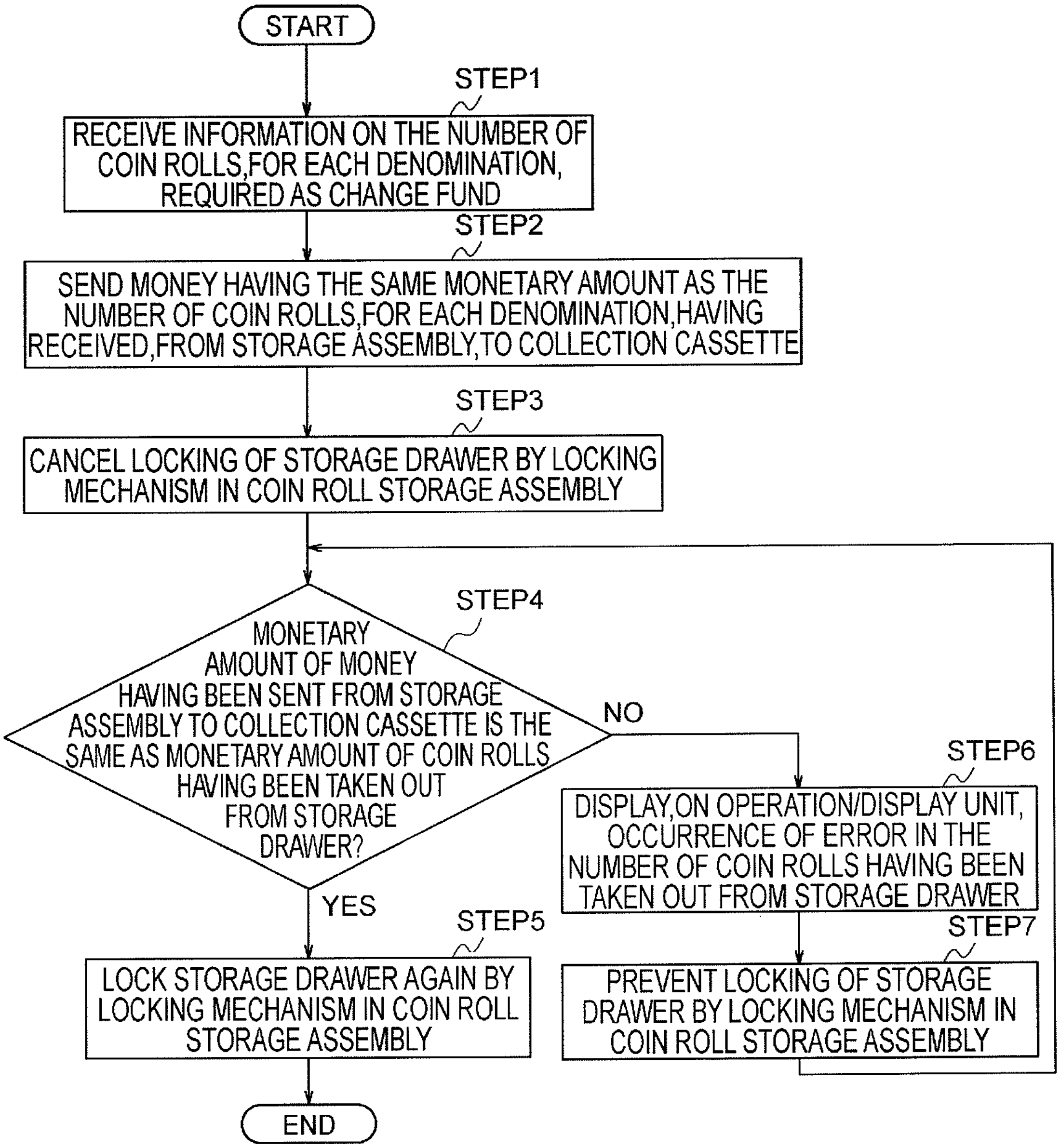
FIG. 7 is a flow chart showing an operation performed by the money depositing and dispensing machine shown in FIG. 1 when a coin roll as change fund is taken out.

An embodiment of the present invention will be described below with reference to the drawings. FIG. 1 to FIG. 7 illustrate a money depositing and dispensing machine according to the present embodiment. Among them, FIG. 1 is a perspective view of an outer appearance of the money depositing and dispensing machine in a money management system according to the present embodiment. FIG. 2 to FIG. 4 illustrate structures of a banknote handling assembly, a coin handling assembly, and a coin roll storage assembly, respectively, in the money depositing and dispensing machine shown in FIG. 1. FIG. 5 is a functional block diagram illustrating a configuration of a control system of the money depositing and dispensing machine shown in FIG. 1. FIG. 6 illustrates management authority for each of a storage assembly, a collection cassette, and a storage drawer of the money depositing and dispensing machine shown in FIG. 1. FIG. 7 is a flow chart showing an operation performed by the money depositing and dispensing machine shown in FIG. 1 when a coin roll (formed by a predetermined number (for example, 20 or 50) of coins of the same denomination being collected and wrapped into a bar-like shape with a film, a wrapping sheet, or the like) is taken out as change fund.

In a store of commercial facilities such as a convenience store or a supermarket, store shelves on which various commodities are displayed are installed in a front office region which customers are allowed to enter, and, in a settlement place in the front office region, a money change machine and a point-of-sales register (POS register) are installed. For checkout of a customer at such a settlement place, a clerk performs depositing of money received for the commodity from the customer in the money change machine or performs dispensing of money as change from the money change machine and delivers the change to the customer. Furthermore, information on a commodity purchased by the customer, information on money stored in the money change machine, and the like are managed by the POS register. Furthermore, in a back office region (specifically, for example, a deposit room) which customers in the store as described above are not allowed to enter, a money depositing and dispensing machine 100 that performs depositing of money collected from the money change machine as proceeds from sales is installed. Furthermore, in a case where money as change is insufficient in the money change machine, money (specifically, coin rolls) is taken out as change fund from the money depositing and dispensing machine 100, and the coin rolls taken out from the money depositing and dispensing machine 100 are unwrapped into loose coins, and money change machine is thereafter replenished with the loose coins.

According to the present embodiment, a guard of a cash-in-transit company takes out collection cassettes 140, 170 (described below) in which banknotes and coins are stored as proceeds from sales in the store, from the money depositing and dispensing machine 100, and the collection cassettes 140, 170 which have the banknotes and the coins stored therein are transported from the store to a management center of the cash-in-transit company. Furthermore, the guard of the cash-in-transit company transports money (specifically, banknotes and coin rolls) as change fund to be used in the money change machine, to the store, from the management center of the cash-in-transit company, and the money as the change fund is deposited by the guard into the money depositing and dispensing machine 100 in the store. Furthermore, the money depositing and dispensing machine 100 is connected via a local area network (LAN) to a terminal or a user server disposed outside the store so as to be able to communicate therewith. An inventory amount of money in the money depositing and dispensing machine 100 and information on operators such as guards of the cash-in-transit company and clerks in the store are managed in the terminal and the user server.

Next, the structure of the money depositing and dispensing machine 100 will be described in detail with reference to FIG. 1 to FIG. 5. As shown in FIG. 1 and the like, the money depositing and dispensing machine 100 of the present embodiment has a housing 101 shaped in an almost rectangular parallelepiped. A banknote handling assembly 110 that performs depositing and dispensing of banknotes, a coin handling assembly 150 that performs depositing and dispensing of coins, and a coin roll storage assembly 180 that stores coin rolls are arranged in the housing 101. As shown in FIG. 1, the banknote handling assembly 110 and the coin handling assembly 150 are aligned in the left-right direction when the money depositing and dispensing machine 100 is viewed from the front side, and the coin roll storage assembly 180 is disposed below the banknote handling assembly 110 and the coin handling assembly 150.

As shown in FIG. 1 and FIG. 2, the banknote handling assembly 110 includes a banknote receptacle unit 120 disposed in the right side region on the front surface side of the housing 101, a banknote dispensing unit 122 disposed below the banknote receptacle unit 120 on the front surface side of the housing 101, a transport unit 130 that transports banknotes one by one in the housing 101, and a plurality of storage/feeding units 134 and 136 that store banknotes in the housing 101 and can feed out the banknotes stored therein. In FIG. 2, the right side surface of the housing 101 corresponds to the surface on the front side of the banknote handling assembly 110, and the leftward direction in FIG. 2 corresponds to the depth direction of the banknote handling assembly 110. As shown in FIG. 2, the transport unit 130 includes a round transport unit 130*a* disposed at the center position in the upper portion of the housing 101, and a plurality of connection transport units 130*b*. Furthermore, the banknote receptacle unit 120, the banknote dispensing unit 122, a dispensing reject unit 124, a cassette mounting unit 126 to which a storage cassette 127 described below is detachably mountable, the collection cassette 140, and the two storage/feeding units 134 and 136 are disposed so as to surround the round transport unit 130*a*. Furthermore, as shown in FIG. 2, the plurality of connection transport units 130*b* connect between the round transport unit 130*a*, and each of the banknote receptacle unit 120, the banknote dispensing unit 122, the dispensing reject unit 124, the cassette mounting unit 126, the collection cassette 140, and the two storage/feeding units 134 and 136. Furthermore, a recognition unit 132 is disposed at the round transport unit 130*a*, and the recognition unit 132 performs recognition of a denomination, authenticity, fitness, face/back, a transport state, and the like for a banknote transported by the round transport unit 130*a*.

The round transport unit 130*a* is configured to transport banknotes one by one in both the clockwise direction and the counterclockwise direction in FIG. 2. Furthermore, in the transport unit 130, a path diverter (not shown) for changing a banknote transport path between the round transport unit 130*a* and each of the connection transport units 130*b* is disposed along the round transport unit 130*a*.

As shown in FIG. 1 and FIG. 2, a banknote inlet 120*a* of the banknote receptacle unit 120 and a banknote outlet 122*a* of the banknote dispensing unit 122 are disposed at the front surface of the housing 101. Furthermore, a door 126*a* is disposed on the front surface side of the cassette mounting unit 126. By the door 126*a* being opened, the storage cassette 127 can be mounted to the cassette mounting unit 126 or the storage cassette 127 can be taken out from the cassette mounting unit 126. Furthermore, as shown in FIG. 5, the cassette mounting unit 126 includes a writing unit 128 that writes various information in a storage medium (not shown) disposed in the storage cassette 127 which is mounted to the cassette mounting unit 126, and a reading unit 129 that reads various information from the storage medium.

The banknote receptacle unit 120 includes a banknote feeding mechanism 121. When it is detected that one banknote or a plurality of banknotes is taken in into the banknote inlet 120*a*, the banknote feeding mechanism 121 is driven and the banknotes are thus fed out one by one through the connection transport unit 130*b* toward the round transport unit 130*a*.

The banknote dispensing unit 122 dispenses banknotes fed out from each of the storage/feeing units 134 and 136 to the round transport unit 130*a*, to the outside of the housing 101, through the banknote outlet 122*a*.

In the dispensing reject unit 124, a banknote, among the banknotes fed out from each of the storage/feeding units 134 and 136 during dispensing, which cannot be recognized by the recognition unit 132 due to abnormality in transporting such as overlapping or skew, is stored as a rejected banknote in dispensing. Furthermore, a banknote, among banknotes taken into the housing 101 from the banknote receptacle unit 120, which cannot be recognized by the recognition unit 132 in depositing due to stain or the like is returned to the banknote dispensing unit 122 as a rejected banknote in depositing.

The storage/feeding units 134 and 136 store banknotes for each denomination, based on the recognition result by the recognition unit 132. Banknotes to be dispensed from the money depositing and dispensing machine 100 as change fund for the money change machine are stored in the storage/feeding units 134 and 136. Specifically, for example, one thousand yen notes are stored in the storage/feeding unit 134, and five thousand yen notes are stored in the storage/feeding unit 136. Ten thousand yen notes are stored in the collection cassette 140 described below. Furthermore, the storage/feeding units 134 and 136 include banknote feeding mechanisms 135 and 137, respectively, and banknotes stored in the storage/feeding units 134 and 136 are fed out one by one through the connection transport units 130*b* toward the round transport unit 130*a* by the banknote feeding mechanisms 135 and 137, respectively.

In the lower region inside the housing 101, the collection cassette 140 is accommodated, and banknotes to be collected by a guard of a cash-in-transit company are stored in the collection cassette 140. Specifically, a banknote recognized by the recognition unit 132 is transported from the round transport unit 130*a* through the connection transport unit 130*b* to the collection cassette 140. Furthermore, a door 140*a* is disposed on the front surface side of the collection cassette 140. By the door 140*a* being opened, the collection cassette 140 can be accommodated in the housing 101 or the collection cassette 140 can be taken out from the housing 101.

Next, the structure of the coin handling assembly 150 will be described. As shown in FIG. 1 and FIG. 3, the coin handling assembly 150 includes a coin receptacle unit 152 disposed in the left side region on the front surface side of the housing 101, a coin dispensing unit 166 disposed below the coin receptacle unit 152 on the front surface side of the housing 101, and a plurality of storage/feeding units 160 that store coins in the housing 101 and can feed out the coins stored therein.

The coin receptacle unit 152 is designed so as to take coins received through a coin inlet, one by one, into the housing 101 in a state where the coins are arranged in one layer in one line. More specifically, the coin receptacle unit 152 includes a coin feeding mechanism 153 (see FIG. 5) implemented by a feed belt or the like. When coins received by the coin receptacle unit 152 are detected, the coin feeding mechanism 153 is driven and the coins are then fed out one by one into the housing 101 by the coin feeding mechanism 153. Furthermore, as shown in FIG. 3, a depositing transport unit 154 for transporting coins fed into the housing 101 by the coin receptacle unit 152 is connected to the coin receptacle unit 152.

As shown in FIG. 3, in the depositing transport unit 154, a recognition unit 156 that performs recognition of a denomination, authenticity, fitness, face/back, a transport state, and the like for a coin, and a first diverter 158 are disposed. The first diverter 158 is designed so as to send a coin such as a rejected coin to be dispensed through the coin dispensing unit 166, from the depositing transport unit 154, on the basis of a coin recognition result by the recognition unit 156, and send the coin to a dispensing transport unit 162.

Meanwhile, coins, such as normal coins, to be stored in the housing 101 are transported to the storage/feeding units 160 by the depositing transport unit 154. The storage/feeding units 160 are structured so as to be able to store coins for each denomination and feed out coins stored therein. Specifically, for example, the six storage/feeding units 160 are disposed so as to correspond to six denominations (500 yen coin, 100 yen coin, 50 yen coin, 10 yen coin, 5 yen coin, and 1 yen coin) of coins that circulate in Japan. Coins are stored for each denomination in the storage/feeding units 160 from the uppermost-stream side (that is, the lowermost side in FIG. 3) of the depositing transport unit 154 in order starting from the smallest denomination coin. Furthermore, each storage/feeding unit 160 includes a coin feeding mechanism (not shown) that feeds out coins stored in the storage/feeding unit 160 one by one to the dispensing transport unit 162.

The dispensing transport unit 162 is designed so as to transport the coins fed out from the storage/feeding units 160, to the coin dispensing unit 166. Furthermore, in the dispensing transport unit 162, for example, a rejected coin sent from the depositing transport unit 154 by the first diverter 158 is transported to the coin dispensing unit 166.

In the lower region in the housing 101, the collection cassette 170 is accommodated, and coins to be collected by a guard of a cash-in-transit company are stored in the collection cassette 170. Specifically, as shown in FIG. 3, a second diverter 164 is disposed at the dispensing transport unit 162, and a coin sent from the dispensing transport unit 162 by the second diverter 164 is transported to the collection cassette 170, and stored in the collection cassette 170. Furthermore, on the front surface side of the collection cassette 170, a door 170*a* is disposed. By the door 170*a* being opened, the collection cassette 170 can be accommodated in the housing 101 or the collection cassette 170 can be taken out from the housing 101.

Next, the structure of the coin roll storage assembly 180 will be described. As shown in FIG. 4, the coin roll storage assembly 180 includes a storage drawer 182 having a plurality of storage regions 180*a* to 180*f* in which coin rolls are stored for each denomination, and the storage drawer 182 can be drawn forward from the housing 101 of the money depositing and dispensing machine 100. As shown in FIG. 4, when coin rolls are stored in the storage regions 180*a* to 180*f*, the longitudinal direction of the coin rolls is oriented in the vertical direction. By the storage drawer 182 being drawn forward from the housing 101 of the money depositing and dispensing machine 100, coin rolls can be stored in the storage regions 180*a* to 180*f*, or coin rolls stored in the storage regions 180*a* to 180*f* can be taken out. Furthermore, as shown in FIG. 5, the coin roll storage assembly 180 has a locking mechanism 184 for locking the storage drawer 182 into the housing 101. In a state where the storage drawer 182 is locked into the housing 101, the storage drawer 182 cannot be drawn forward from the housing 101. Furthermore, the coin roll storage assembly 180 includes a weight measurement unit 186 for measuring the weight of coin rolls stored in each of the storage regions 180*a* to 180*f* of the storage drawer 182, for each of the storage regions 180*a* to 180*f*. The number of coin rolls stored in each of the storage regions 180*a* to 180*f* of the storage drawer 182 is detected by a control unit 102 described below, for each of the storage regions 180*a* to 180*f*, on the basis of the weight of the coin rolls measured by the weight measurement unit 186.

In order to detect the number of coin rolls stored in each of the storage regions 180*a* to 180*f*, the number of coin rolls stored in each of the storage regions 180*a* to 180*f* may be detected by using a line sensor or a magnetic sensor instead of the weight of the coin rolls being measured by the weight measurement unit 186 or in addition to the weight of the coin rolls being measured by the weight measurement unit 186. Alternatively, by using the line sensor and the magnetic sensor in combination, the number of coin rolls stored in each of the storage regions 180*a* to 180*f* may be detected. Furthermore, each of the storage regions 180*a* to 180*f* may have a line sensor or a magnetic sensor.

Furthermore, in the example shown in FIG. 4, each of the storage regions 180*a* to 180*f* is sectioned into a plurality of regions, and 10 coin rolls are stored in each section. However, the present invention is not limited to such an example. Five coin rolls may be stored in each section. Alternatively, three coin rolls may be stored in each section. Furthermore, a plurality of kinds of sections may be used in combination so as to store the different numbers of coin rolls. Furthermore, although an exemplary case where the number of the coin roll storage assemblies 180 disposed is one, has been described above, the present invention is not limited to such an example. A plurality of the coin roll storage assemblies 180 may be disposed. In this case, a plurality of the coin roll storage assemblies 180 may be disposed so as to correspond to the denominations, respectively, of the coin rolls. Alternatively, for example, coin rolls of a plurality of denominations may be stored in each of two coin roll storage assemblies 180.

In the present embodiment, the banknote receptacle unit 120, the banknote dispensing unit 122, a dispensing reject unit 124, the cassette mounting unit 126, and the storage/feeding units 134, 136 in the banknote handling assembly 110, and the coin receptacle unit 152, the depositing transport unit 154, the recognition unit 156, the first diverter 158, each storage/feeding unit 160, the dispensing transport unit 162, and the second diverter 164 in the coin handling assembly 150 are combined with each other, to configure a storage assembly capable of storing banknotes and coins that are taken in into the housing 101 from the outside, and dispensing the stored banknotes and coins from the housing 101 to the outside (see FIG. 6).

Next, the configuration of a control system of the money depositing and dispensing machine 100 as described above will be described with reference to FIG. 5. As shown in FIG. 5, the control unit 102 is disposed in the housing 101 of the money depositing and dispensing machine 100 according to the present embodiment, and the control unit 102 controls the components of the banknote handling assembly 110, the coin handling assembly 150, and the coin roll storage assembly 180. Specifically, the banknote feeding mechanism 121, the transport unit 130, the recognition unit 132, the storage/feeding units 134 and 136, the cassette mounting unit 126, the writing unit 128, the reading unit 129, and the like in the banknote handling assembly 110 are connected to the control unit 102. Banknote recognition information by the recognition unit 132, and information read by the reading unit 129 from the storage medium disposed at the storage cassette 127 are transmitted to the control unit 102, and the control unit 102 controls the components by transmitting an instruction signal to each of the components of the banknote handling assembly 110. Furthermore, the coin feeding mechanism 153, the depositing transport unit 154, the recognition unit 156, the first diverter 158, the storage/feeding units 160, the dispensing transport unit 162, the second diverter 164, and the like in the coin handling assembly 150 are connected to the control unit 102. Coin recognition information by the recognition unit 156 is transmitted to the control unit 102, and the control unit 102 controls the components by transmitting an instruction signal to each of the components of the coin handling assembly 150. Furthermore, the locking mechanism 184, the weight measurement unit 186, and the like of the coin roll storage assembly 180 are connected to the control unit 102, and the result of measurement of coin rolls by the weight measurement unit 186 is transmitted to the control unit 102, and the control unit 102 controls the locking mechanism 184 by transmitting an instruction signal to the locking mechanism 184.

Furthermore, as shown in FIG. 5, an operation/display unit 104, a communication unit 105, a memory unit 106, and a detection unit 108 are connected to the control unit 102. The operation/display unit 104 is implemented by a touch panel or the like disposed at an upper portion of the housing 101. An operation screen operated by an operator, and information on an inventory amount of money stored in each of the banknote handling assembly 110, the coin handling assembly 150, and the coin roll storage assembly 180 are displayed on the operation/display unit 104. Furthermore, the operation/display unit 104 described above allows an operator to touch an operation button on the operation screen with her/his finger, thereby inputting various instructions to the control unit 102. The communication unit 105 can transmit various signals to and receive various signals from a terminal and a user server via the LAN. Information on an inventory amount of money stored in each of the banknote handling assembly 110, the coin handling assembly 150, and the coin roll storage assembly 180, and various information such as a money handling history in the money depositing and dispensing machine 100 are stored in the memory unit 106. The detection unit 108 detects a monetary amount of coin rolls taken out from the storage drawer 182, based on the weight of the coin rolls measured by the weight measurement unit 186.

Next, management authority under which each of money stored in the storage assembly (specifically, storage/feeding units 134, 136, 160), money collected in the collection cassettes 140, 170, and money stored in the storage drawer 182 of the coin roll storage assembly 180 is to be managed in the money depositing and dispensing machine 100 of the present embodiment will be described with reference to FIG. 6. In the present embodiment, the management authority for managing money in the housing 101 of the money depositing and dispensing machine 100 includes two management authorities that are management authority of the store and management authority of the cash-in-transit company. An operator (for example, clerk) belonging to the store has the management authority of the store and can access a first part in the money depositing and dispensing machine 100 being allocated the management authority of the store. An operator (for example, guard) belonging to the cash-in-transit company has the management authority of the cash-in-transit company and can access a second part in the money depositing and dispensing machine 100 being allocated the management authority of the cash-in-transit company. The former management authority is referred to as a first management authority, and the latter management authority is referred to as a second management authority. In the present embodiment, only an operator who has the management authority is allowed to access each of money stored in the storage assembly (specifically, each storage/feeding unit 134, 136, 160), money stored in each collection cassette 140, 170 (collection unit), and money stored in the storage drawer 182 (replenishing unit) of the coin roll storage assembly 180. In the present embodiment, as shown in FIG. 6, as management authority for money stored in the storage assembly (specifically, each storage/feeding unit 134, 136, 160), management authority of a facility (specifically, store) in which the money depositing and dispensing machine 100 is installed, is allocated. Meanwhile, as management authority for money collected in each collection cassette 140, 170 and money (specifically, coin rolls) stored in the storage drawer 182 of the coin roll storage assembly 180, management authority of an organization (specifically, cash-in-transit company) that collects money from the store by the collection cassettes 140, 170, is allocated. As described below, in the present embodiment, only an operator (for example, store manager or the like) who has a specific authority in the store is allowed to access and take out coin rolls stored in the storage drawer 182 of the coin roll storage assembly 180, from the storage drawer 182. Meanwhile, even the operator who has the specific authority in the store is not allowed to access and take out the money collected in the collection cassettes 140, 170 from the housing 101 to the outside. Only an operator who is a guard of a cash-in-transit company and has the management authority of the organization is allowed to access and take out the money collected in the collection cassettes 140, 170 from the housing 101 to the outside.

Next, an operation performed by a guard of a cash-in-transit company for replenishing the money depositing and dispensing machine 100 of the present embodiment with money (specifically, coin rolls) and collecting money as proceeds from sales, from the money depositing and dispensing machine 100, will be described. Firstly, the guard of the cash-in-transit company conveys money (specifically, coin rolls) as change fund to be used in the money change machine, to the store, from a management center of the cash-in-transit company. Next, the guard inputs his/her identification number and password through the operation/display unit 104, thereby causing the control unit 102 to perform authentication of the guard. Instead of the identification number and password being inputted through the operation/display unit 104 to perform authentication of the guard, a card reader that reads an IC card may be disposed at the money depositing and dispensing machine 100, and the guard may cause the card reader to read his/her IC card to perform authentication of the guard. When the authentication of the guard has been performed by the control unit 102, the doors 140*a* and 170*a* are unlocked and the doors 140*a* and 170*a* can be opened. Thus, the guard is allowed to take out the collection cassettes 140, 170 from the housing 101, and collect money stored in the collection cassettes 140, 170 together with the collection cassettes 140, 170. Furthermore, when the authentication of the guard has been performed by the control unit 102, locking of the storage drawer 182 by the locking mechanism 184 is canceled. Thus, the guard is allowed to draw out the storage drawer 182 forward from the housing 101, and to replenish the storage regions 180*a* to 180*f* of the storage drawer 182 with coin rolls (specifically, coin rolls as change fund used in the money change machine) for each denomination. In this manner, in the present embodiment, money collected in the collection cassettes 140, 170 and money stored in the storage drawer 182 of the coin roll storage assembly 180 are managed under the management authority of the cash-in-transit company, whereby the guard of the cash-in-transit company is allowed to take out the collection cassettes 140, 170 from the housing 101, and to collect money stored in the collection cassettes 140, 170 together with the collection cassettes 140, 170, and replenish the storage drawer 182 of the coin roll storage assembly 180 with coin rolls. In particular, the guard of the cash-in-transit company is allowed to directly replenish the storage drawer 182 of the coin roll storage assembly 180 without delivering, to a clerk or the like of the store, the coin rolls with which the storage drawer 182 of the coin roll storage assembly 180 is to be replenished. Therefore, even when a clerk or the like of the store is absent, the storage drawer 182 can be replenished with coin rolls, thereby improving convenience for the guard.

Next, an operation performed, by an operator such as a store manager of the store who has a predetermined authority, for taking out money (specifically, coin rolls) from the money depositing and dispensing machine 100 in order to replenish a money change machine with money as change fund will be described with reference to the flow chart shown in FIG. 7.

When a manager (for example, store manager or the like) who has the predetermined authority in the store takes out coin rolls from the money depositing and dispensing machine 100, the store manager or the like firstly inputs her/his identification number and password through the operation/display unit 104, thereby causing the control unit 102 to perform authentication of the store manager or the like. Instead of the identification number and password being inputted through the operation/display unit 104 to perform authentication of the store manager or the like, a card reader which reads an IC card may be disposed at the money depositing and dispensing machine 100, and the store manager or the like may cause the card reader to read her/his IC card to perform authentication of the store manager or the like. In the present embodiment, since coin rolls stored in the storage drawer 182 of the coin roll storage assembly 180 are managed under the management authority of the cash-in-transit company, ordinary clerks who do not have the predetermined authority in the store are not allowed to take out the coin rolls from the storage drawer 182, and only an operator, such as a store manager, who has the predetermined authority is allowed to take out the coin rolls from the storage drawer 182. After authentication of the store manager or the like has been performed by the control unit 102, the store manager or the like inputs the number of coin rolls, for each denomination, required as change fund in the money change machine, by using the operation/display unit 104. Thus, the control unit 102 of the money depositing and dispensing machine 100 receives information on the number of coin rolls, for each denomination, required as the change fund (STEP1). When the information has been received by the control unit 102, money is delivered from the storage assembly to the collection cassette 140, 170. More specifically, money that has the same monetary amount as the number of the coin rolls, for each denomination, which has been received by the control unit 102 is transported from the storage assembly to the collection cassette 140, 170 (STEP2).

Specifically, when money is delivered from the storage assembly to the collection cassette 140, 170, banknotes stored in the storage/feeding unit 134, 136 are fed out to the transport unit 130 by the banknote feeding mechanism 135, 137, and the banknotes are transported to the collection cassette 140 by the transport unit 130 in the banknote handling assembly 110, or coins stored in each storage/feeding unit 160 are fed out from the storage/feeding unit 160 to the dispensing transport unit 162, and the coins transported by the dispensing transport unit 162 are sent by the second diverter 164 to the collection cassette 170 in the coin handling assembly 150. The manner in which money is delivered from the storage assembly to the collection cassette 140, 170 is not limited to the manner in which money fed out from each storage/feeding unit 134, 136, 160 is transported to the collection cassettes 140, 170 as described above, and various other manners can be used. For example, when money is delivered from the storage assembly to the collection cassette 140, 170, the store manager or the like puts money in the banknote receptacle unit 120 or the coin receptacle unit 152, and the money taken into the housing 101 by the banknote receptacle unit 120 or the coin receptacle unit 152 may be transported directly to the collection cassette 140, 170 without storing the money in the storage/feeding unit 134, 136, 160, Furthermore, in still another exemplary manner, when money is delivered from the storage assembly to the collection cassette 140, 170, the storage cassette 127 in which banknotes that have the same monetary amount as the number of coin rolls, for each denomination, which has been received by the control unit 102 are stored, may be mounted to the cassette mounting unit 126 by the store manager or the like, and banknotes fed out from the mounted storage cassette 127 into the housing 101 may be transported to the collection cassette 140.

When the money which has the same monetary amount as the number of coin rolls, for each denomination, which has been received by the control unit 102 is transported from the storage assembly to the collection cassette 140, 170, locking of the storage drawer 182 by the locking mechanism 184 in the coin roll storage assembly 180 is canceled (STEP3). Thus, the store manager or the like is allowed to draw the storage drawer 182 from the housing 101, and take out the coin rolls from the storage drawer 182. The monetary amount of the coin rolls taken out from the storage drawer 182 is detected by the detection unit 108 based on the weight of the coin rolls measured by the weight measurement unit 186.

The control unit 102 compares the monetary amount of the money transported from the storage assembly to the collection cassette 140, 170, with the monetary amount, detected by the detection unit 108, of the coin rolls that have been taken out from the storage drawer 182. When both of the monetary amounts are the same ("YES" in STEP4), the locking mechanism 184 can lock again the storage drawer 182 into the housing 101 in the coin roll storage assembly 180. Thus, when the store manager or the like returns the storage drawer 182 into the housing 101, the storage drawer 182 is locked into the housing 101 by the locking mechanism 184 (STEP5). Thus, the operation performed by the store manager or the like of the store for taking out coin rolls from the money depositing and dispensing machine 100 is completed. Meanwhile, in a case where the storage drawer 182 is returned into the housing 101, when both the monetary amounts are not the same ("NO" in STEP4), a warning message indicating that error in the number of coin rolls taken out from the storage drawer 182 has occurred is displayed on the operation/display unit 104 (STEP6). Thus, the store manager or the like knows that the number of coin rolls, for each denomination, which is required as change fund for the money change machine and which has been firstly inputted through the operation/display unit 104 is not the same as the number of coin rolls, for each denomination, which has actually been taken out from the storage drawer 182. In this case, the storage drawer 182 cannot be locked into the housing 101 by the locking mechanism 184 in the coin roll storage assembly 180 (STEP7). Thus, even when the storage drawer 182 is returned into the housing 101, the storage drawer 182 is not locked into the housing 101. Therefore, the store manager or the like is allowed to know that error in the number of coin rolls taken out from the storage drawer 182 has occurred. Furthermore, in a case where, even when the storage drawer 182 is returned into the housing 101, the storage drawer 182 is not locked into the housing 101, the operation of taking out coin rolls from the money depositing and dispensing machine 100 is not completed. Therefore, a mode for taking out coin rolls from the coin roll storage assembly 180 is continued by the control unit 102 until the monetary amount of money transported from the storage assembly to the collection cassette 140, 170 becomes the same as the monetary amount of coin rolls which have been taken out from the storage drawer 182 and has been detected by the detection unit 108.

Thus, in the method for taking out coin rolls from the money depositing and dispensing machine 100 based on the flow chart shown in FIG. 7, money is firstly transported from the storage assembly to the collection cassette 140, 170, whereby the management authority for the money is changed from the management authority of the store to the management authority of the cash-in-transit company, and the coin rolls are thereafter taken out from the storage drawer 182 of the coin roll storage assembly 180 by the store manager or the like of the store, and the management authority for the coin rolls is thus changed from the management authority of the cash-in-transit company to the management authority of the store. Furthermore, the coin rolls which have the same monetary amount as money transported from the storage assembly to the collection cassette 140, 170 are taken out from the storage drawer 182 by the store manager or the like, whereby the monetary amount of the money managed under the management authority of the store and the monetary amount of the money managed under the management authority of the cash-in-transit company are not changed. Thus, in the present embodiment, a store manager or the like of a store is allowed to take out coin rolls from the storage drawer 182 managed under the management authority of the cash-in-transit company such that the monetary amount of money managed under the management authority of the store and the monetary amount of the money managed under the management authority of the cash-in-transit company, are not changed.

In the money depositing and dispensing machine 100, of the present embodiment, having the above-described configuration, the control unit 102 manages money stored in the storage/feeding unit 134, 136, 160 (storage unit) of the storage assembly under the first management authority (specifically, the management authority of the store), and manages money stored in the collection cassette 140, 170 (collection unit) and money stored in the storage drawer 182 (replenishing unit) under the second management authority (specifically, the management authority of the cash-in-transit company) different from the first management authority. Accordingly, the management authority for the replenishing unit (specifically, the storage drawer 182 of the coin roll storage assembly 180) in which money for replenishing an external device (specifically, for example, money change machine) is stored can be made different from the management authority for the storage assembly.

Specifically, in a conventional money depositing and dispensing machine, a guard of a cash-in-transit company delivers, to a clerk or the like of a store, money as change fund conveyed to the store from the management center of the cash-in-transit company. The clerk or the like of the store who has received the money as change fund from the guard puts the money in the inlet opening of the money depositing and dispensing machine. More specifically, in the conventional money depositing and dispensing machine, since the coin roll storage assembly is not managed under the management authority of the cash-in-transit company, the guard of the cash-in-transit company is not allowed to store coin rolls as change fund delivered to the store directly into the coin roll storage assembly. Meanwhile, in the present embodiment, since the management authority for the storage drawer 182 of the coin roll storage assembly 180 is different from the management authority (that is, the management authority of the store) for the storage assembly, the guard of the cash-in-transit company is allowed to store the coin rolls as change fund delivered to the stores directly into the storage drawer 182, and the guard needs not deliver the coin rolls as change fund to a clerk or the like of the store, whereby work load on the guard of the cash-in-transit company can be reduced.

In the present embodiment, the first management authority under which money stored in the storage/feeding unit 134, 136, 160 of the storage assembly is managed is not limited to the management authority of a facility, such as a store, in which the money depositing and dispensing machine 100 is installed, and may be the management authority of various other business entities. Furthermore, the second management authority under which each of money stored in the collection cassette 140, 170 (collection unit) and money stored in the storage drawer 182 (replenishing unit) is managed is not limited to the management authority of an organization, such as a cash-in-transit company, which collects money from the collection unit, and may be management authority of various other business entities.

Furthermore, the money depositing and dispensing machine 100 according to the present embodiment is not limited to one having the above-described configuration, and various modifications can be added thereto.

For example, the replenishing unit for storing money with which an external device such as a money change machine is to be replenished, is not limited to a unit for storing coin rolls. As the replenishing unit of the money handling machine according to the present invention, a unit for storing money other than coin rolls may be used.

Furthermore, in the present embodiment, in a case where banknotes as well as coin rolls are delivered as change fund to a store by a guard of a cash-in-transit company, the banknotes are stored in a collection cassette different from the collection cassette 140 (that is, the collection cassette 140 in which banknotes collected from the storage/feeding unit 134, 136 are stored) mounted in the housing 101 of the money depositing and dispensing machine 100, and is thus delivered to the store. The guard of the cash-in-transit company mounts the collection cassette in which banknotes as change fund are stored, into the housing 101 of the money depositing and dispensing machine 100, in exchange for the collection cassette 140 in which banknotes collected from the storage/feeding unit 134, 136 are stored. Furthermore, in a case where banknotes as change fund are delivered to the store in a state where banknotes are stored in the collection cassette, an operator (for example, store manager or the like) who has a specific authority in the store is allowed to take out the collection cassette (that is, the collection cassette in which banknotes as change fund are stored) mounted to the housing 101 of the money depositing and dispensing machine 100 to the outside of the housing 101, and take out banknotes from the collection cassette. Accordingly, the operator who has the specific authority in the store is allowed to replenish an external device such as a money change machine with banknotes taken out from the collection cassette, or deposits the banknotes in the banknote handling assembly 110 of the money depositing and dispensing machine 100 to replenish each storage/feeding unit 134, 136 therewith.

Furthermore, in the present embodiment, in addition to an external device such as a money change machine being replenished with coin rolls taken out from the storage drawer 182 of the coin roll storage assembly 180 in the money depositing and dispensing machine 100 by an operator (for example, store manager or the like) who has the specific authority in the store, or instead of an external device such as a money change machine being replenished with coin rolls taken out from the storage drawer 182, the operator who has the specific authority in the store may unwrap the coin rolls taken out from the storage drawer 182, into loose coins, and thereafter deposits the loose coins into the coin handling assembly 150 of the money depositing and dispensing machine 100, to replenish each storage/feeding unit 160 with the loose coins.

Furthermore, in the money depositing and dispensing machine 100 of the present embodiment, the coin roll storage assembly 180 as a replenishing unit may not be disposed in the housing 101, and a coin roll storage assembly (replenishing unit) having a configuration similar to that of the coin roll storage assembly 180 may be disposed separately from the money depositing and dispensing machine 100 of the present embodiment. In this case, the money handling system may be structured by the money depositing and dispensing machine 100 and the coin roll handling assembly having such configurations being combined with each other. Such a money handling system includes a control unit for managing money stored in the storage/feeding units 134, 136, 160 of the storage assembly in the money depositing and dispensing machine 100 under the first management authority (specifically, the management authority of the store), and managing money collected in the collection cassettes 140, 170 of the money depositing and dispensing machine 100 and at least a part of money stored in the coin roll storage assembly disposed separately from the money depositing and dispensing machine 100, under the second management authority (specifically, the management authority of the cash-in-transit company) different from the first management authority. Such a control unit may be disposed in the money depositing and dispensing machine 100 or the coin roll handling assembly. Alternatively, such a control unit may be disposed in an external device (for example, a higher-order terminal for managing the money depositing and dispensing machine 100) disposed separately from the money depositing and dispensing machine 100 and the coin roll handling assembly.

In the above description, all the coin rolls stored in the storage drawer 182 of the coin roll storage assembly 180 as a replenishing unit are managed under the management authority of a cash-in-transit company. However, the present embodiment is not limited thereto. For example, a part of coin rolls stored in the storage drawer 182 may be managed under the management authority of a cash-in-transit company and another part of the coin rolls stored in the storage drawer 182 may be managed under the management authority of a store. More specifically, coin rolls (for example, coin rolls stored in each of the storage regions **180*d* to 180*f*) stored in a storage region on the depth side of the storage drawer 182 may be managed under the management authority of a cash-in-transit company, and coin rolls (for example, coin rolls stored in each of the storage regions 180*a* to 180*c*) stored in a storage region on the front side of the storage drawer 182 may be managed under the management authority of a store. In this case, when a guard of a cash-in-transit company replenishes the money depositing and dispensing machine 100 with coin rolls, the guard stores the coin rolls in the storage region on the depth side of the storage drawer 182. Meanwhile, when a store manager or the like of the store takes out coin rolls as change fund from the money depositing and dispensing machine 100, the store manager or the like transfers the coin rolls from the storage region on the depth side of the storage drawer 182 to the storage region on the front side, and thereafter takes out only coin rolls required as change fund from the storage drawer 182. Furthermore, the weight measurement unit 186 can measure the weight of coin rolls stored in the storage regions 180***a* to 180*f* of the storage drawer 182, for each of the storage regions 180*a* to 180*f*. Therefore, the number of coin rolls, for each denomination, managed under the management authority of a store, and the number of coin rolls, for each denomination, managed under the management authority of a cash-in-transit company, among coin rolls stored in the storage drawer 182, can be detected.

In this case, a distance over which the storage drawer 182 is drawn from the housing 101 may be changed according to the authority of the operator. For example, when authentication of a guard of a cash-in-transit company and a manager, such as a store manager in a store, who has a predetermined authority has been performed by the control unit 102, the entirety of the storage drawer 182 may be drawn from the housing 101. Thus, coin rolls can be put into or taken out from the storage region on the depth side of the storage drawer 182. Meanwhile, when authentication of an ordinary clerk, in the store, who does not have the predetermined authority has been performed by the control unit 102, only the storage region portion on the front side of the storage drawer 182 can be drawn from the housing 101. In this case, among coin rolls stored in the storage drawer 182, although coin rolls managed under the management authority of the store can be accessed, coin rolls managed under the management authority of the cash-in-transit company cannot be accessed. Therefore, the clerk of the store is allowed to take out only the coin rolls managed under the management authority of the store, from the storage drawer 182, among the coin rolls stored in the storage drawer 182.

Furthermore, the storage region (that is, the storage region in which coin rolls managed under the management authority of the store are stored) on the front side of the storage drawer 182 and the storage region (that is, storage region in which coin rolls managed under the management authority of the cash-in-transit company are stored) on the depth side thereof may be closed by different lids, respectively. For example, the guard of the cash-in-transit company and the store manager or the like of the store may be allowed to open both the lids, whereas ordinary clerks of the store may be allowed to open only the lid for closing the storage region on the front side. Also in this case, the ordinary clerks of the store are allowed to take out only coin rolls managed under the management authority of the store, among the coin rolls stored in the storage drawer 182, from the storage drawer 182.

Furthermore, when the management authority of coin rolls stored in the storage drawer 182 is separated into the management authority of the store and the management authority of the cash-in-transit company, the management authority of the store and the management authority of the cash-in-transit company may be allocated to the storage region on the left side and the storage region on the right side, respectively, of the storage drawer 182 as viewed from the front side of the storage drawer 182 without allocating the management authorities to the storage region on the front side and the storage region on the depth side, respectively, of the storage drawer 182.

Furthermore, in the money depositing and dispensing machine 100 of the present embodiment, in a case where an error occurs while money is counted in the banknote handling assembly 110 or the coin handling assembly 150, when an operator (for example, customer) cannot perform cancellation of the error, the money removed from the banknote handling assembly 110 or the coin handling assembly 150 may be stored in a portion which can be locked into the housing 101 of the money depositing and dispensing machine 100. In this case, in order to prevent another operator who stands in front of the money depositing and dispensing machine 100 from taking out the money which is temporarily stored, after the money is put into the portion which can be locked into the housing 101 of the money depositing and dispensing machine 100, a password is inputted through the operation/display unit 104 or an IC card of the operator is read by a card reader, whereby locking can be performed such that the money cannot be taken out. At this time, information on the method for making contact with the operator who has performed the operation for the locking may be set.

Thereafter, when the maintenance staff has arrived at the money depositing and dispensing machine 100, the operator who has performed the operation for the locking is notified of information indicating that the maintenance staff has arrived. When the operator cancels the locking in the money depositing and dispensing machine 100, money can be taken out from the housing 101 of the money depositing and dispensing machine 100. Thereafter, the maintenance staff performs cancelling of the error in the money depositing and dispensing machine 100 in the presence of the operator. Thus, the operator is allowed to continuously perform handling of money in the money depositing and dispensing machine 100.

In the money depositing and dispensing machine 100 having the above-described configuration, in a case where error occurs while money is counted in the banknote handling assembly 110 or the coin handling assembly 150, also when an operator (for example, customer) cannot perform cancelling of the error, the operator can leave the money depositing and dispensing machine 100 until the maintenance staff arrives at the money depositing and dispensing machine 100, so that the customer or the like need not wait in front of the money depositing and dispensing machine 100, thereby reducing load on the customer or the like. Furthermore, since restriction of movement of the customer or the like is alleviated, the maintenance staff is allowed to adjust a time at which cancellation of the error in the money depositing and dispensing machine 100 is performed, so as to, for example, delay the time, thereby also reducing load on the maintenance staff.

As the portion which can be locked into the housing 101 of the money depositing and dispensing machine 100, for example, the storage drawer 182 of the coin roll storage assembly 180, the cassette mounting unit 126 of the banknote handling assembly 110, another unused space, and the like can be considered. Furthermore, when the money depositing and dispensing machine 100 includes a temporary storage unit or an object storage unit for storing objects other than money, the temporary storage unit or the object storage unit may be used as the portion which can be locked into the housing 101 of the money depositing and dispensing machine 100.

Figure 8:
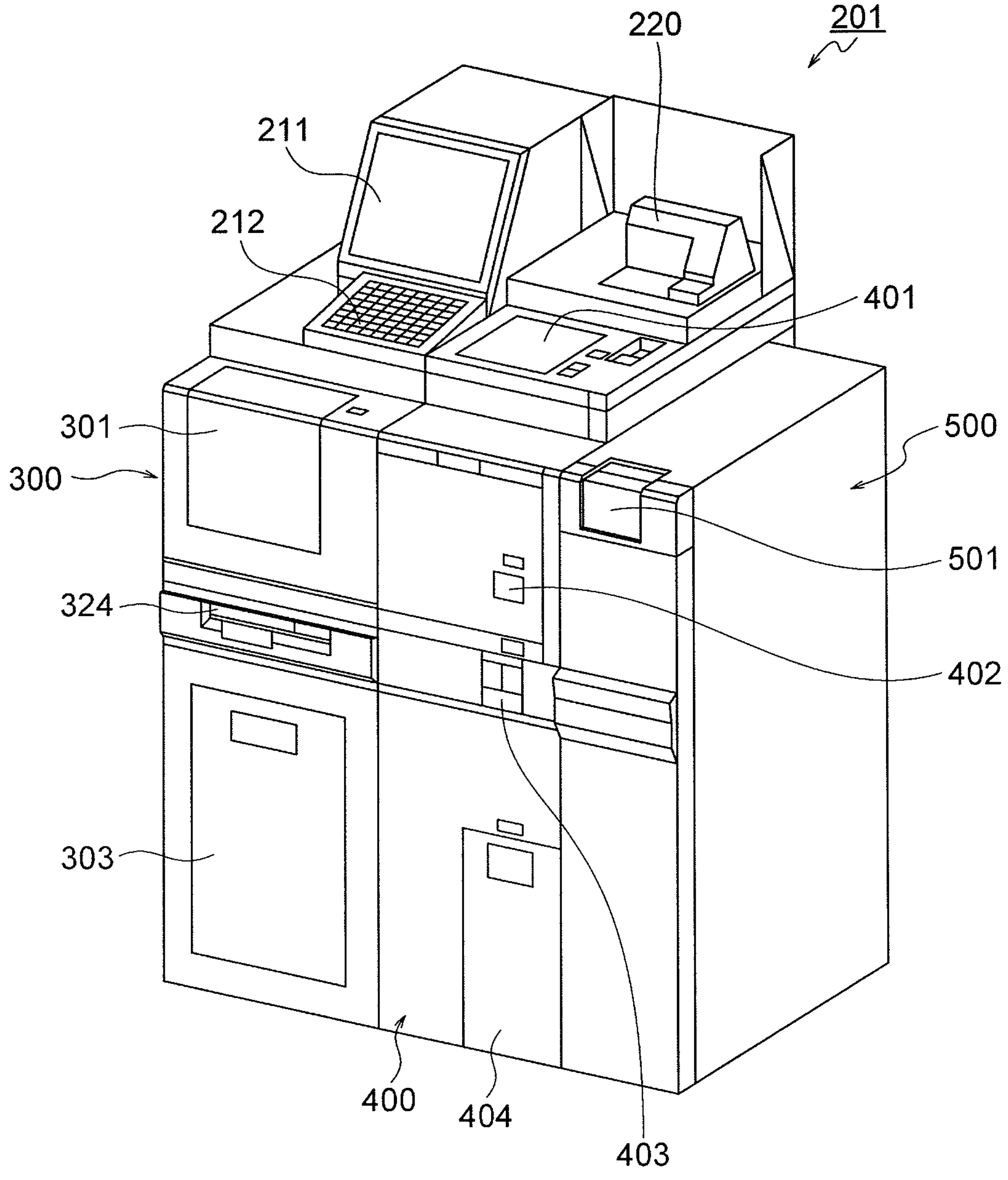
FIG. 8 is a perspective view of an outer appearance of a money handling apparatus having another configuration according to an embodiment of the present invention.
Figure 9:
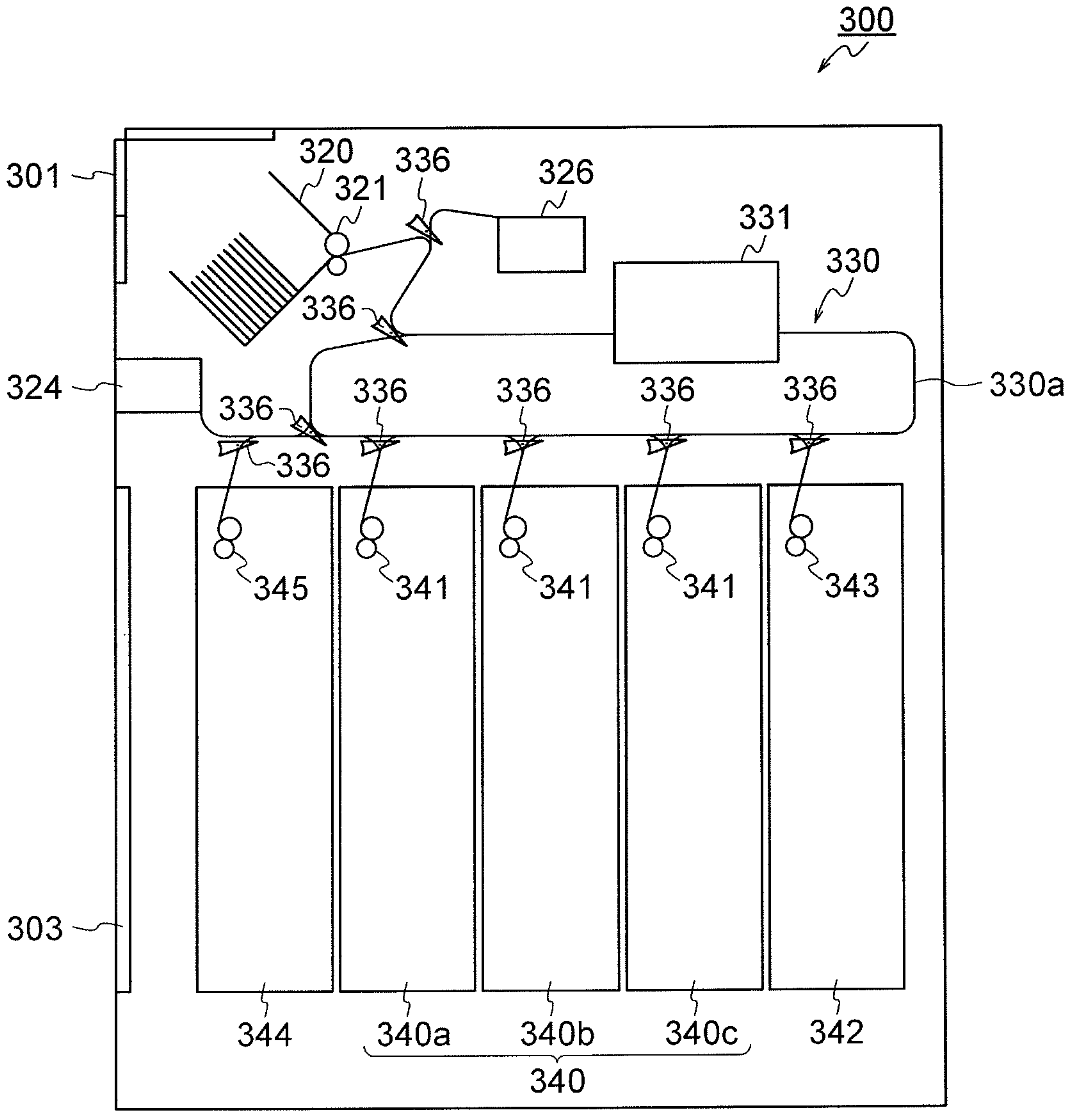
FIG. 9 illustrates an internal structure of a banknote handling unit of the money handling apparatus shown in FIG. 8, as viewed from the lateral side thereof.
Figure 10:
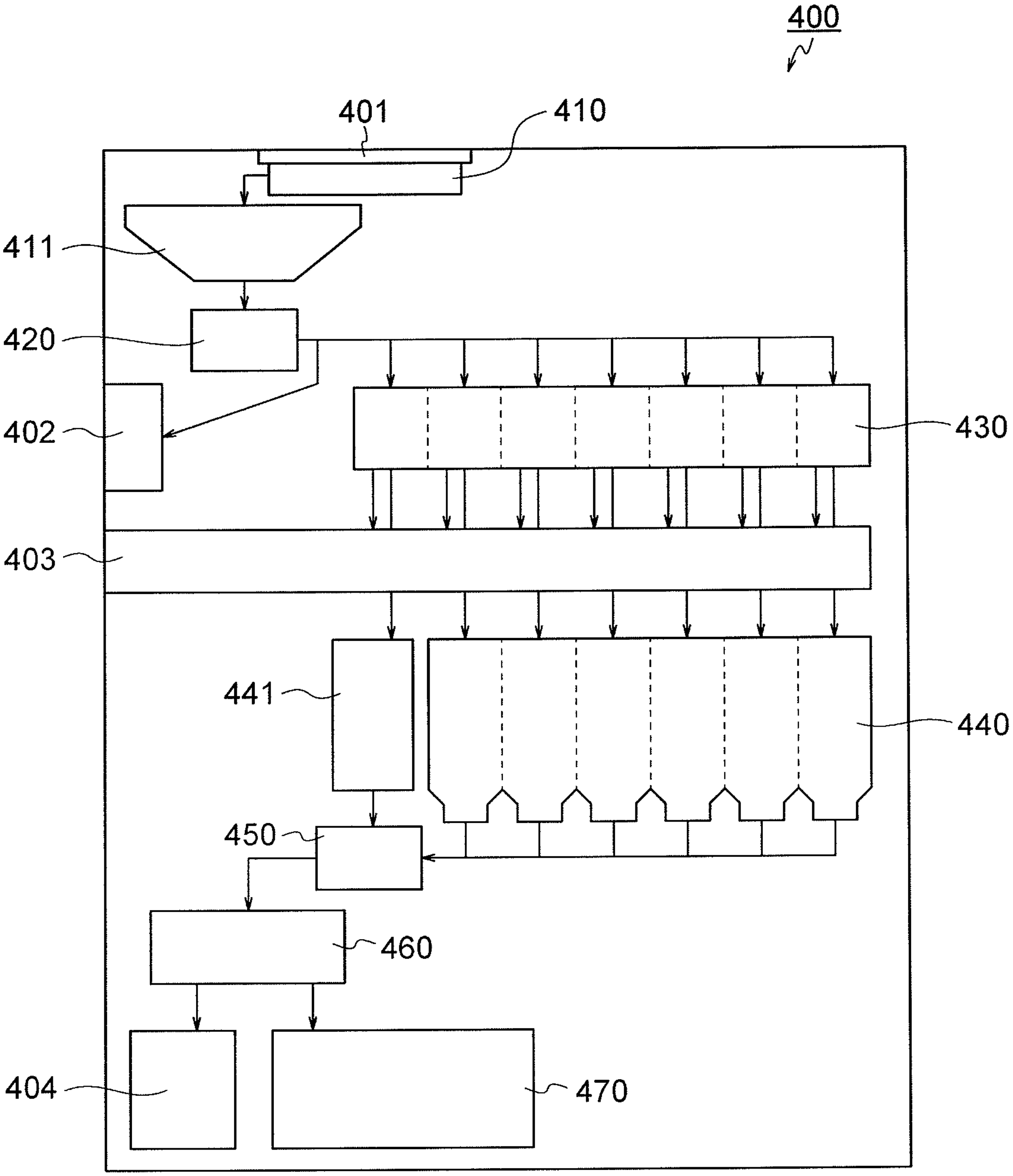
FIG. 10 illustrates an internal structure of a coin handling unit of the money handling apparatus shown in FIG. 8, as viewed from the lateral side thereof.
Figure 11:
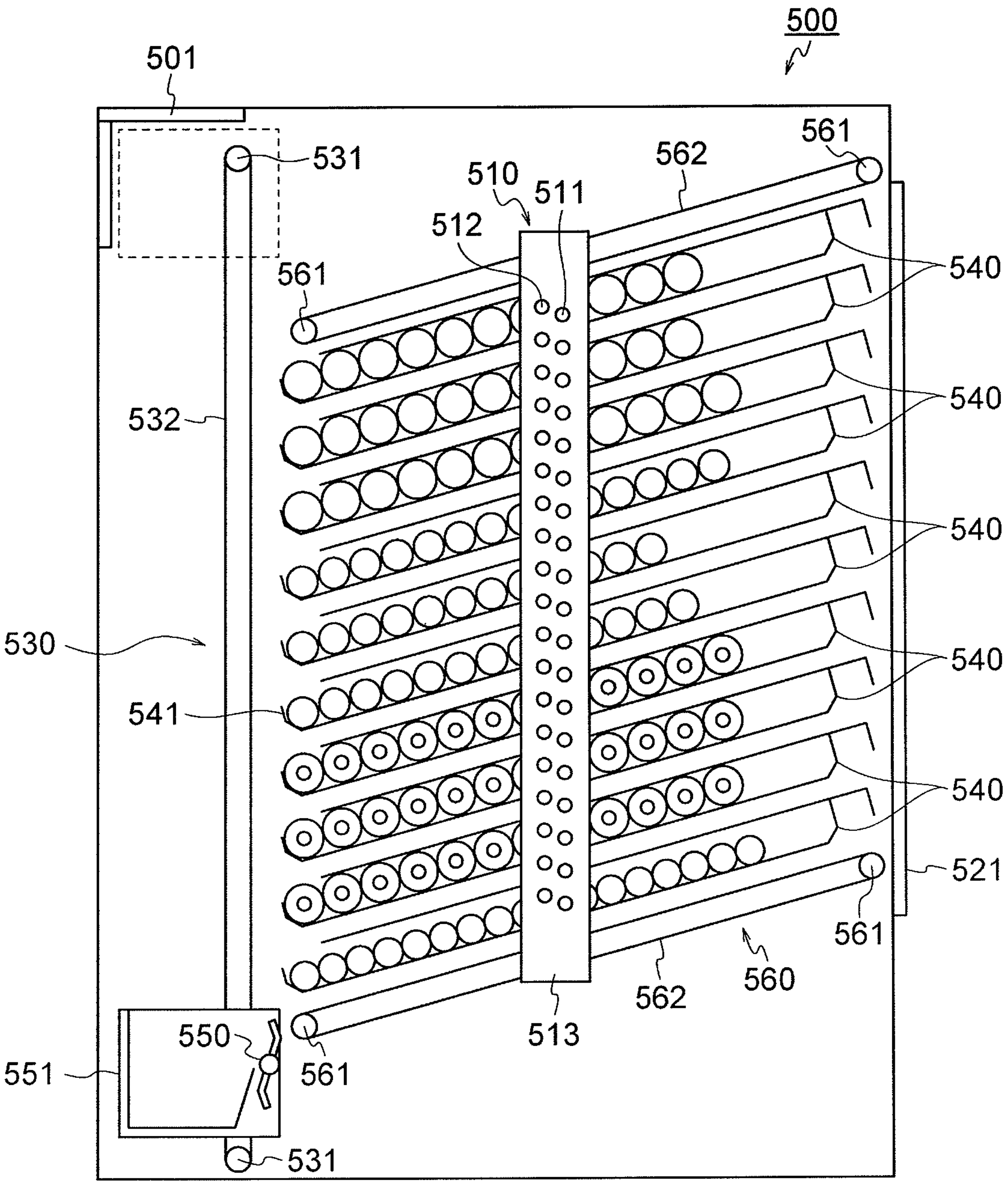
FIG. 11 illustrates an internal structure of a coin roll handling unit of the money handling apparatus shown in FIG. 8, as viewed from the lateral side thereof.
Figure 12:
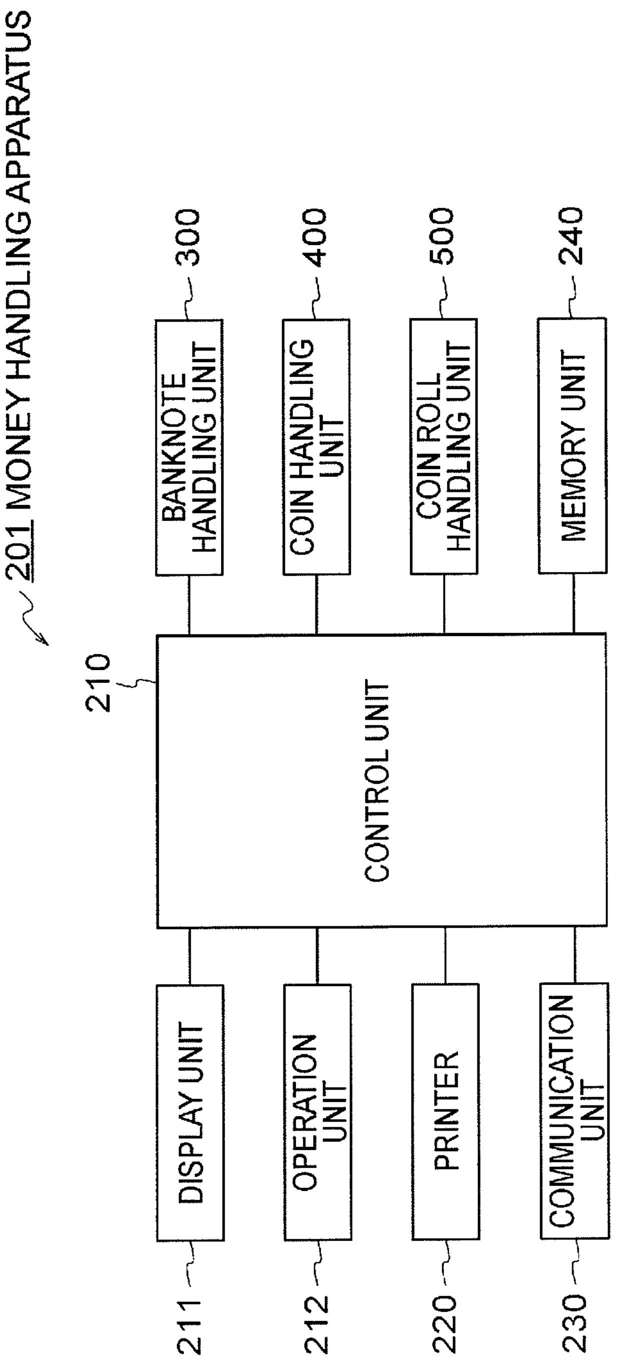
FIG. 12 is a functional block diagram illustrating a configuration of a control system of the money handling apparatus shown in FIG. 8.
Figure 13:
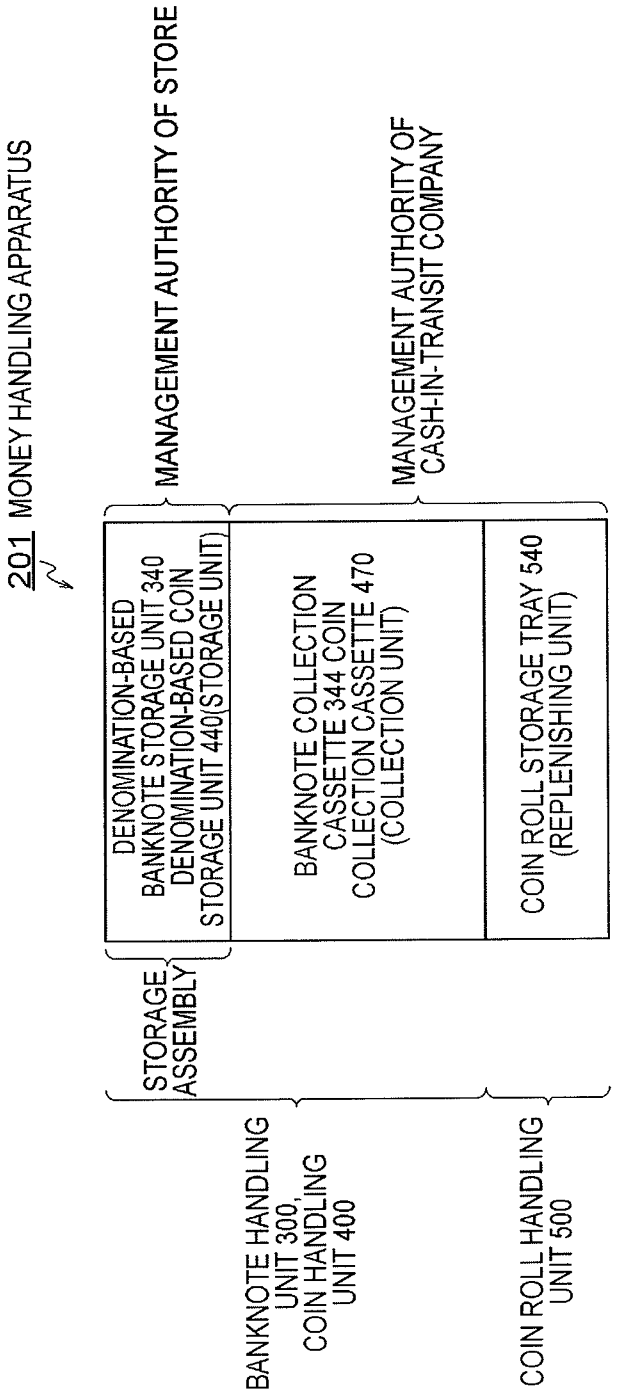
FIG. 13 illustrates management authority for each of a storage assembly, a collection cassette, and a coin roll storage tray of the money handling apparatus shown in FIG. 8.

As the money handling machine according to the present invention, a money handling apparatus 201 shown in FIG. 8 to FIG. 13 may be used. FIG. 8 is a perspective view of an outer appearance of the money handling apparatus 201 having another configuration of the present embodiment. FIG. 9 to FIG. 11 illustrate internal structures of a banknote handling unit 300, a coin handling unit 400, and a coin roll handling unit 500, respectively, of the money handling apparatus 201 shown in FIG. 8 as viewed from the lateral side. FIG. 12 is a functional block diagram illustrating a configuration of a control system of the money handling apparatus 201 shown in FIG. 8. FIG. 13 illustrates management authority for each of the storage assembly, collection cassettes 344, 470, and a coin roll storage tray 540 of the money handling apparatus 201 shown in FIG. 8.

As shown in FIG. 8 and FIG. 9, a banknote inlet/outlet 320 for taking in banknotes to be deposited, and dispensing banknotes to be dispensed is disposed at the upper portion on the front surface side of a housing of the banknote handling unit 300. The banknote inlet/outlet 320 functions as a banknote inlet and a banknote outlet. A shutter mechanism 301 which is openable and closable is disposed at the banknote inlet/outlet 320, and the banknote inlet/outlet 320 is usually closed by a shutter. When banknotes are deposited or dispensed, the shutter is opened by the shutter mechanism 301, to open the banknote inlet/outlet 320, whereby banknotes can be deposited or dispensed.

Depositing of banknotes in the banknote handling unit 300 will be described. When an operation unit 212 is operated to start the depositing, the shutter is opened by the shutter mechanism 301, to open the banknote inlet/outlet 320. When banknotes to be deposited are taken in into the banknote inlet/outlet 320, the shutter is closed again. The banknotes taken in into the banknote inlet/outlet 320 are fed out one by one onto a banknote transport path that forms a banknote transport unit 330, by a banknote feeding mechanism 321. The banknotes fed out onto the banknote transport path are transported, in a loop-shaped banknote transport path that allows banknotes to be transported clockwise, toward a banknote recognition unit 331. The banknote transport unit 330 includes the banknote transport path and diverters 336 disposed at a plurality of portions in the banknote transport path, and the banknotes transported on the banknote transport path are each sent to a diverged transport path by the diverter 336, thereby controlling the destination to which the banknotes are to be transported.

The banknote recognition unit 331 has a function of recognizing denominations, fitness, authenticity, and the like of the banknotes transported by the banknote transport unit 330 and counting the banknotes. Among banknotes transported clockwise via the banknote recognition unit 331 in the loop-shaped banknote transport path, a banknote which cannot be recognized by the banknote recognition unit 331, a banknote recognized as being not normal, a banknote for which abnormality in transporting (skew, overlapping, chaining, or the like) has been detected, or the like is transported toward the front side of the apparatus, and stacked in a depositing reject unit 324, in order to return the banknote as a rejected note which cannot be deposited. Meanwhile, normal banknotes which can be deposited are temporarily stored in a banknote temporary storage unit 342.

All the banknotes taken in into the banknote inlet/outlet 320 are recognized by the banknote recognition unit 331, and are stacked in the banknote temporary storage unit 342 or the depositing reject unit 324. Thereafter, a result of recognizing and counting the taken-in banknotes is displayed on a display unit 211. When a user who has confirmed the display cancels the depositing by using the operation unit 212, the banknotes that are temporarily stored in the banknote temporary storage unit 342 are fed out onto the banknote transport path by a banknote feeding mechanism 343 and returned to the banknote inlet/outlet 320. Meanwhile, when the user performs an operation for accepting the depositing, the banknotes which are temporarily stored in the banknote temporary storage unit 342 are each fed out onto the banknote transport path, and stored in a corresponding one of denomination-based banknote storage units 340. For example, ten thousand yen notes are stored in a denomination-based banknote storage unit 340*a*, five thousand yen notes are stored in a denomination-based banknote storage unit 340*b*, and one thousand yen notes are stored in a denomination-based banknote storage unit 340*c*.

At this time, for example, banknotes, such as two thousand yen notes, which are not allocated to any of the denomination-based banknote storage units 340, and a damaged note (unfit note) of a denomination which is allocated to one of the denomination-based banknote storage units 340 but cannot be used for the dispensing are stored in the banknote collection cassette 344. The banknote collection cassette 344 is detachably mounted to the apparatus such that the banknote collection cassette 344 can be removed to the outside of the apparatus by opening a door 303 on the front surface of the apparatus. The banknote collection cassette 344 can be used also for storing banknotes collected from the denomination-based banknote storage unit 340. Specifically, banknotes to be collected are fed out from the denomination-based banknote storage unit 340 and stored in the banknote collection cassette 344, and the banknote collection cassette 344 is thereafter removed from the apparatus to collect the banknotes. Furthermore, the banknote collection cassette 344 also has a banknote feeding mechanism 345. Banknotes for replenishing are stored in the banknote collection cassette 344, and the banknotes for replenishing are fed out onto the banknote transport path and the denomination-based banknote storage unit 340 can be replenished with the banknotes.

Next, dispensing of banknotes in the banknote handling unit 300 will be described. The operation unit 212 is operated while information displayed on the display unit 211 is being checked, to start dispensing. When a denomination and the number of banknotes to be dispensed are designated, the designated number of banknotes of the designated denomination are fed out one by one from a corresponding one of the denomination-based banknote storage units 340, and the banknotes are transported counterclockwise on the loop-shaped banknote transport path toward the banknote recognition unit 331. The banknotes are fed out by a banknote feeding mechanism 341 disposed in each denomination-based banknote storage unit 340. The banknote having been recognized for the denomination and the like by the banknote recognition unit 331 is continuously transported counterclockwise toward the banknote inlet/outlet 320. Banknotes which are determined, by the banknote recognition unit 331, to be not able to be dispensed are sent without transporting the banknotes to the banknote inlet/outlet 320, and stacked as rejected notes in the dispensing reject unit 326. Meanwhile, banknotes which are recognized as being able to be dispensed are stacked in the banknote inlet/outlet 320. When all the banknotes to be dispensed have been stacked in the banknote inlet/outlet 320, the shutter is opened by the shutter mechanism 301. When a user has taken out all the banknotes in the banknote inlet/outlet 320, the shutter is closed again by the shutter mechanism 301 to complete the dispensing.

As shown in FIG. 8 and FIG. 10, the coin handling unit 400 has a housing shaped in an almost rectangular parallelepiped, and a coin inlet 401 through which coins are taken in is disposed on the upper surface of the housing. The coin inlet 401 includes a shutter mechanism and a supply hopper 410. The supply hopper 410 is usually closed by a shutter.

When coins are taken in, the shutter is opened, and multiple coins can be deposited into the supply hopper 410 having its upper surface opened.

Depositing of coins in the coin handling unit 400 having the above-described structure will be described. When depositing is started, the shutter of the coin inlet 401 is opened to open the supply hopper 410. After coins are taken in through the coin inlet 401 into the supply hopper 410, the supply hopper 410 is closed again by the shutter, and the coins deposited into the supply hopper 410 are transported to a coin feeding hopper 411. The coins in the coin feeding hopper 411 are fed out one by one to a coin transport path, and transported by a coin transport unit. A deposited-coin recognition unit 420 is disposed in the coin transport path, and the deposited-coin recognition unit 420 recognizes denominations, fitness, authenticity, and the like of the coins transported by the coin transport unit and counts the coins. A chute for dropping coins into the deposited-coin reject unit 402 or a deposited-coin temporary storage unit 430 is disposed in the coin transport path on the downstream side, in the transport direction, of the deposited-coin recognition unit 420. Each coin is sent to the deposited-coin reject unit 402 or the deposited-coin temporary storage unit 430 based on the result of recognition by the deposited-coin recognition unit 420. The coins stacked in the deposited-coin reject unit 402 can be taken out from the front surface of the housing of the coin handling unit 400. In FIG. 10, the flow of coins including coins transported in the coin transport path by the coin transport unit is indicated by arrows connecting between the units.

The deposited-coin temporary storage unit 430 is sectioned into seven storage units. For example, six storage units on the rear surface side are used for temporarily storing 500 yen coins, 10 yen coins, 100 yen coins, 50 yen coins, 1 yen coins, and 5 yen coins in order, respectively, starting from the rear surface side, and no denomination is allocated to the storage unit on the forefront side, and the storage unit on the forefront side is used for temporarily storing coins of any denomination. For example, coins which cannot be used for dispensing are temporarily stored as deformed coins in the storage unit on the forefront side, and coins which can be used for dispensing are temporarily stored for each denomination in the six storage units disposed rearward of the storage unit on the forefront side.

The deposited-coin temporary storage unit 430 is disposed so as to be movable almost horizontally in the housing in the left-right direction of the apparatus. The bottom surface of the deposited-coin temporary storage unit 430 is closed at the center position and the deposited-coin temporary storage unit 430 temporarily stores coins thereinside, whereas, when the deposited-coin temporary storage unit 430 moves leftward or rightward, the bottom surface thereof is opened and the temporarily stored coins are dropped.

In FIG. 10, in order to illustrate the flow of coins, a deposited-coin return box 403, and a free-coin storage unit 441 and a denomination-based coin storage unit 440 are arranged in the up-down direction. However, in practice, the deposited-coin return box 403 is disposed on the right side as viewed from a user who uses the apparatus, and the free-coin storage unit 441 and the denomination-based coin storage unit 440 are disposed on the left side as viewed from the user, below the deposited-coin temporary storage unit 430. By the deposited-coin temporary storage unit 430 being moved leftward or rightward, a temporarily stored coin is selectively put in one of the deposited-coin return box 403, and the free-coin storage unit 441 and the denomination-based coin storage unit 440.

All the coins taken in into the coin inlet 401 are recognized by the deposited-coin recognition unit 420, and are stacked in the deposited-coin temporary storage unit 430 or the deposited-coin reject unit 402. Thereafter, a result of recognizing and counting the taken-in coins is displayed on the display unit 211. When a user who has confirmed the display performs an operation for canceling the depositing by using the operation unit 212, the deposited-coin temporary storage unit 430 moves rightward, and the bottom surface of the deposited-coin temporary storage unit 430 is opened, to store all the coins which are temporarily stored, in the deposited-coin return box 403. The deposited-coin return box 403 can be drawn from the front surface of the housing of the coin handling unit 400. The deposited-coin return box 403 is drawn to allow the returned coins to be taken out.

Meanwhile, when a user who has confirmed the recognition result performs an operation for accepting the depositing by using the operation unit 212, the deposited-coin temporary storage unit 430 moves leftward, and the bottom surface of the deposited-coin temporary storage unit 430 is opened, to store all the coins which are temporarily stored, in the free-coin storage unit 441 and the denomination-based coin storage unit 440. The denomination-based coin storage unit 440 is sectioned into a plurality of storage units so as to correspond to the deposited-coin temporary storage unit 430, and the coins stored for each denomination in the deposited-coin temporary storage unit 430 are stored as they are in the denomination-based coin storage unit 440 for each denomination.

Next, dispensing of coins in the coin handling unit 400 will be described. In the dispensing, only the number of coins, for each denomination, to be dispensed are fed out one by one from the denomination-based coin storage unit 440 to the coin transport path. The denomination and the number of the coins fed out to the coin transport path are recognized by a dispensed-coin recognition unit 450. Thereafter, the coins are temporarily stored in the dispensed-coin temporary storage unit 460. When all the coins to be dispensed have been temporarily stored, all the coins which are temporarily stored in the dispensed-coin temporary storage unit 460 are discharged into a coin dispensing box 404. The coin dispensing box 404 is structured so as to be drawn forward from the front surface side of the housing, together with the coin collection cassette 470 disposed on the rear surface side. When dispensing is performed, the coin dispensing box 404 and the coin collection cassette 470 are drawn toward the front side of the apparatus so as to expose only the coin dispensing box 404, whereby the coins to be dispensed can be taken out. The coin dispensing box 404 functions as a coin outlet through which coins are dispensed.

The coin collection cassette 470 is used for storing coins which are temporarily stored in the dispensed-coin temporary storage unit 460 when dispensing is canceled. Furthermore, the coin collection cassette 470 can be also used for collecting coins from the free-coin storage unit 441 and the denomination-based coin storage unit 440. After coins to be collected are stored in the coin collection cassette 470, the coin collection cassette 470 is drawn toward the front side of the apparatus until the coin collection cassette 470 is exposed outside the apparatus. The coin collection cassette 470 is detachably mounted to the apparatus, and the coin collection cassette 470 having coins stored thereinside can be removed from the apparatus and conveyed.

In the present embodiment, the banknote inlet/outlet 320, the banknote feeding mechanism 321, the banknote transport unit 330, the banknote recognition unit 331, the diverters 336, the depositing reject unit 324, each denomination-based banknote storage unit 340, and the banknote temporary storage unit 342 of the banknote handling unit 300, and the supply hopper 410, the coin feeding hopper 411, the deposited-coin recognition unit 420, the deposited-coin reject unit 402, the coin transport unit, the deposited-coin temporary storage unit 430, and the denomination-based coin storage unit 440 of the coin handling unit 400 are combined with each other, to structure a storage assembly capable of storing banknotes and coins deposited from the outside of the money handling apparatus 201, and dispensing banknotes and coins stored therein from the money handling apparatus 201 to the outside (see FIG. 13).

As shown in FIG. 11, in the housing of the coin roll handling unit 500, a plurality of coin roll storage trays 540 for storing coin rolls in an aligned state is disposed. Furthermore, a coin roll outlet 501 having a shutter mechanism is disposed at the upper portion on the front surface side of the housing, and the coin roll outlet 501 is usually closed by the shutter. When coin rolls are dispensed, the shutter is opened to dispense coin rolls from the coin roll outlet 501.

An openable and closable door 521 is disposed at the rear surface of the housing. In a state where the openable and closable door 521 is opened, and the coin roll storage tray 540 is drawn toward the rear surface side, coin rolls are stored in each coin roll storage tray 540 for each denomination. When coin rolls are stored such that the longitudinal direction of the coin roll corresponds to the left-right direction (the depth direction of the drawing sheet in FIG. 11) of the apparatus, the stored coin rolls are moved forward in the coin roll storage tray 540 disposed so as to be tilted downward, and stored in an aligned state. A support 541 for supporting the front surface side portion of each coin roll in the forefront line is formed at the front end of the coin roll storage tray 540. Furthermore, not-illustrated openings are formed at two portions at the front end of the coin roll storage tray 540, and a dispensing member 550 disposed in a coin roll transport box 551 rotates while passing through the openings to take out coin rolls. This will be described below in detail.

In the coin roll handling unit 500, coin roll detection sensors 510 and a sensor moving unit 560 are disposed. The coin roll detection sensors 510 include: hole sensors 511 each of which detects for presence or absence of a hole of a coin roll; diameter sensors 512 each of which measures the diameter of a coin roll; and a pair of sensor substrates 513 on which the sensors 511 and 512 are disposed. The sensor moving unit 560 supports the pair of sensor substrates 513 and moves the pair of sensor substrates 513 along the front-rear direction of the apparatus. The sensor moving unit 560 includes a plurality of pulleys 561 disposed on the front end side and the rear end side of the coin roll storage tray 540, and endless belts 562 extended over the pulleys 561 on the front side and the rear side. The sensor moving unit 560 rotates the belts 562 in the forward and reverse directions, and reciprocates the coin roll detection sensor 510 along the coin roll storage tray 540 in the front-rear direction. The coin roll detection sensors 510, which are disposed so as to face each other such that the coin roll storage tray 540 is disposed therebetween, are reciprocated, whereby the coin roll storage tray 540 is scanned by the sensors 511 and 512 that emit and receive light for examination, to detect for presence or absence of a hole of a coin roll, detect the diameter of a coin, and detect the number of coin rolls. Thus, in the coin roll handling unit 500, the denomination and the number of stored coin rolls can be managed.

As shown in FIG. 11, the coin roll transport box 551 for transporting coin rolls to be dispensed and a transport box moving unit 530 for moving the coin roll transport box 551 in the up-down direction are disposed on the front side of the coin roll storage tray 540. The dispensing member 550 which is driven to rotate counterclockwise is disposed on the coin roll storage tray 540 side (right side in FIG. 11) of the coin roll transport box 551. The transport box moving unit 530 includes a pair of endless belts 532 disposed on both side surfaces (both side surfaces in the depth direction of the drawing sheet in FIG. 11) of the coin roll transport box 551, and a pair of pulleys 531 arranged in the up-down direction in a state where each belt 532 is extended over the pair of pulleys 531. By the pulleys 531 being rotated in the forward and reverse directions, the coin roll transport box 551 can be moved in the up-down direction.

When coin rolls are dispensed, the operation unit 212 and the display unit 211 are used to designate a denomination and the number of coin rolls to be dispensed. Thus, the coin roll transport box 551 disposed at the lowermost initial position is moved upward, and stops in front of the coin roll storage tray 540 in which coin rolls of the denomination to be dispensed are stored. The dispensing member 550 is driven to rotate counterclockwise, whereby the coin roll disposed at the forefront line is scooped up, to store the coin roll in the coin roll transport box 551. When the number of coin rolls to be dispensed are stored in the coin roll transport box 551, the same operation is repeatedly performed for another denomination of coin rolls to be subsequently dispensed. After all the denominations of coin rolls to be dispensed are stored in the coin roll transport box 551, the coin roll transport box 551 is moved to the dispensing position at the uppermost portion indicated by a broken line in FIG. 11. When the coin roll transport box 551 has reached the dispensing position, the shutter of the coin roll outlet 501 is opened by the shutter mechanism, and the coin roll transport box 551 is in a state in which the coin rolls can be taken out from the coin roll transport box 551. When all the coin rolls have been taken out from the coin roll transport box 551, the shutter is closed again by the shutter mechanism to close the coin roll outlet 501. The coin roll transport box 551 is moved to the lowermost initial position to complete the dispensing of coin rolls.

FIG. 12 is a block diagram illustrating a configuration of a control system of the money handling apparatus 201. The money handling apparatus 201 includes, in addition to the display unit 211, the operation unit 212, a printer 220, the banknote handling unit 300, the coin handling unit 400, and the coin roll handling unit 500 shown in FIG. 8 to FIG. 11, a communication unit 230, a memory unit 240, and a control unit 210 that controls each of the units.

The operation unit 212 is implemented by a keyboard or the like, and is used for allowing input of various kinds of information such as instruction information and setting information on money handling. The display unit 211 is implemented by a liquid crystal display unit or the like, and is used for outputting and displaying various kinds of information on money handling. The printer 220 is used for printing information on money handling, such as depositing and dispensing, performed by the money handling apparatus 201.

The communication unit 230 has a function of performing data transmission to and data reception from an external device such as a POS server. The memory unit 240 is a nonvolatile storage device such as a semiconductor memory or a hard disk, and is used for storing a program required for the control unit 210 to control each unit, and various kinds of information on setting such as setting for depositing and setting for replenishment. In addition thereto, in the memory unit 240, various kinds of information such as information on dispensing, information on depositing, and information required for authentication of cashiers, are stored.

Next, management authority under which each of money stored in the storage assembly (specifically, the denomination-based banknote storage unit 340 and the denomination-based coin storage unit 440), money collected in the banknote collection cassette 344 and the coin collection cassette 470, and money stored in the coin roll storage tray 540 of the coin roll handling unit 500 are to be managed in the money handling apparatus 201 shown in FIG. 8 to FIG. 12, will be described with reference to FIG. 13. In the present embodiment, the management authority for managing money in the money handling apparatus 201 includes two management authorities that are management authority (first management authority) of a store, and management authority (second management authority) of a cash-in-transit company. Only an operator who has the management authority is allowed in general to access each of the money stored in the storage assembly (specifically, the denomination-based banknote storage unit 340 and the denomination-based coin storage unit 440), the money collected in the banknote collection cassette 344 and the coin collection cassette 470, and the money stored in the coin roll storage tray 540 of the coin roll handling unit 500. In the present embodiment, as shown in FIG. 13, as the management authority of the money stored in the storage assembly (specifically, the denomination-based banknote storage unit 340 and the denomination-based coin storage unit 440), the management authority of a facility (specifically, store) in which the money handling apparatus 201 is installed, is allocated. Meanwhile, as management authority of money collected in the banknote collection cassette 344 and the coin collection cassette 470, and money (specifically, coin rolls) stored in the coin roll storage tray 540 of the coin roll handling unit 500, the management authority of an organization (specifically, cash-in-transit company) that collects money from a store by using the banknote collection cassette 344 and the coin collection cassette 470, is allocated. As described below, in the present embodiment, only an operator (for example, store manager or the like) who has a specific authority in the store is allowed to dispense coin rolls stored in the coin roll storage tray 540 of the coin roll handling unit 500, from the coin roll handling unit 500. Meanwhile, even the operator who has the specific authority in the store is not allowed to take out the money collected in the banknote collection cassette 344 and the coin collection cassette 470, from the money handling apparatus 201, to the outside.

Next, an operation performed by a guard of a cash-in-transit company for replenishing the money handling apparatus 201 of the present embodiment with money (specifically, coin rolls) or collecting money as proceeds from sales, from the money handling apparatus 201, will be described. Firstly, the guard of the cash-in-transit company conveys money (specifically, coin rolls) as change fund to be used in a money change machine, to the store, from the management center of the cash-in-transit company. Next, the guard inputs his/her identification number and password through the operation unit 212, thereby causing the control unit 210 to perform authentication of the guard. Instead of the identification number and password being inputted through the operation unit 212 to perform authentication of the guard, a card reader that reads an IC card may be disposed in the money handling apparatus 201, and the guard may cause the card reader to read his/her IC card to perform authentication of the guard. When the authentication of the guard has been performed by the control unit 210, the door 303 is unlocked to open the door 303. Thus, the guard is allowed to take out the banknote collection cassette 344 from the banknote handling unit 300, and collect banknotes stored in the banknote collection cassette 344, together with the banknote collection cassette 344. Furthermore, when authentication of the guard has been performed by the control unit 210, the coin collection cassette 470 can be taken out from the coin handling unit 400 to the outside. Thus, the guard is allowed to take out the coin collection cassette 470 from the coin handling unit 400 and collect coins stored in the coin collection cassette 470, together with the coin collection cassette 470. When the authentication of the guard has been performed by the control unit 210, the openable and closable door 521 of the coin roll handling unit 500 is opened, whereby the guard is allowed to replenish each of the coin roll storage trays 540 with coin rolls. Accordingly, in the present embodiment, money collected in the banknote collection cassette 344 and the coin collection cassette 470, and money stored in the coin roll storage tray 540 of the coin roll handling unit 500 are each managed under the management authority of the cash-in-transit company. Therefore, the guard of the cash-in-transit company is allowed to take out the banknote collection cassette 344 and the coin collection cassette 470 from the banknote handling unit 300 and the coin handling unit 400, to collect money stored in the banknote collection cassette 344 and the coin collection cassette 470 together with the banknote collection cassette 344 and the coin collection cassette 470, and to replenish the coin roll storage tray 540 of the coin roll handling unit 500 with coin rolls. In particular, the guard of the cash-in-transit company is allowed to directly replenish the coin roll storage tray 540 of the coin roll handling unit 500 with coin rolls for replenishing the coin roll storage tray 540 of the coin roll handling unit 500, without delivering the coin rolls to a clerk or the like of the store. Therefore, even when a clerk or the like of the store is absent, the coin roll storage tray 540 can be replenished with coin rolls, thereby enhancing convenience for the guard.

Next, an operation performed, by an operator such as a store manager of the store who has a predetermined authority, for taking out money (specifically, coin rolls) from the money handling apparatus 201 in order to replenish a money change machine with money as change fund, will be described below.

When a manager (for example, store manager or the like) who has a predetermined authority in the store takes out coin rolls from the money handling apparatus 201, the store manager or the like firstly inputs her/his identification number and password through the operation unit 212, thereby causing the control unit 210 to perform authentication of the store manager or the like. Instead of the identification number and password being inputted through the operation unit 212 to perform the authentication of the store manager or the like, a card reader that reads an IC card may be disposed in the money handling apparatus 201, and the store manager or the like may cause the card reader to read her/his IC card to perform the authentication of the store manager or the like. In the present embodiment, since coin rolls stored in the coin roll storage tray 540 of the coin roll handling unit 500 are managed under the management authority of the cash-in-transit company, ordinary clerks who do not have the predetermined authority in the store are not allowed to perform dispensing of coin rolls stored in the coin roll storage tray 540 in the coin roll handling unit 500, and only the operator such as the store manager or the like who has the predetermined authority is allowed to perform dispensing of the coin rolls stored in the coin roll storage tray 540 in the coin roll handling unit 500. After the authentication of the store manager or the like has been performed by the control unit 210, the store manager or the like inputs the number of coin rolls, for each denomination, required as change fund for a money change machine, by using the operation unit 212. Thereafter, in the banknote handling unit 300 or the coin handling unit 400, money is delivered from the storage assembly to the banknote collection cassette 344 or the coin collection cassette 470. More specifically, money which has the same monetary amount as the number of coin rolls, for each denomination, which has been inputted by the store manager or the like using the operation unit 212 is sent from the storage assembly to the banknote collection cassette 344 or the coin collection cassette 470.

Specifically, when money is delivered from the storage assembly to the banknote collection cassette 344 or the coin collection cassette 470, banknotes stored in the denomination-based banknote storage units 340 are fed out to the banknote transport unit 330 by the banknote feeding mechanism 341, and the banknotes are sent to the banknote collection cassette 344 by the banknote transport unit 330 in the banknote handling unit 300, and coins stored in the denomination-based coin storage units 440 are fed out from the denomination-based coin storage units 440, and are recognized by the dispensed-coin recognition unit 450, and are thereafter sent to the coin collection cassette 470 in the coin handling unit 400. A manner in which money is delivered from the storage assembly to the banknote collection cassette 344 or the coin collection cassette 470 is not limited to the manner in which money fed out from the denomination-based banknote storage units 340 or the denomination-based coin storage units 440 is sent to the banknote collection cassette 344 or the coin collection cassette 470 as described above, and various other manners can be used. For example, when money is delivered from the storage assembly to the banknote collection cassette 344 or the coin collection cassette 470, the store manager or the like may deposit money in the banknote inlet/outlet 320 or the coin inlet 401, and the money deposited into the banknote handling unit 300 or the coin handling unit 400 by the banknote inlet/outlet 320 or the coin inlet 401 may be sent directly to the banknote collection cassette 344 or the coin collection cassette 470 without storing the money in the denomination-based banknote storage units 340 or the denomination-based coin storage units 440. In still another example, a banknote storage cassette and a coin storage cassette can be mounted into the banknote inlet/outlet 320 and the coin inlet 401, respectively, and, when money is delivered from the storage assembly to the banknote collection cassette 344 or the coin collection cassette 470, the store manager or the like mounts, into the banknote inlet/outlet 320 or the coin inlet 401, the banknote storage cassette or the coin storage cassette in which money which has the same monetary amount as the number of coin rolls, for each denomination, which has been received by the control unit 210 are stored, and money fed out from the banknote storage cassette or the coin storage cassette having been mounted, into the banknote handling unit 300 or the coin handling unit 400, may be sent to the banknote collection cassette 344 or the coin collection cassette 470.

When money which has the same monetary amount as the number of coin rolls, for each denomination, which has been received by the control unit 210 is sent from the storage assembly to the banknote collection cassette 344 or the coin collection cassette 470, dispensing of coin rolls stored in the coin roll storage tray 540 is performed in the coin roll handling unit 500. Furthermore, the shutter for closing the coin roll outlet 501 is opened. Thus, the store manager or the like is allowed to take out coin rolls from the coin roll transport box 551. When the coin rolls have been taken out from the coin roll transport box 551, and the coin roll outlet 501 has been closed by the shutter, the operation performed, by the store manager or the like of the store, for taking out coin rolls from the money handling apparatus 201 is completed. In the money handling apparatus 201 shown in FIG. 8 to FIG. 13, unlike in the money depositing and dispensing machine 100 shown in FIG. 1 to FIG. 7, coin rolls are automatically dispensed from the coin roll handling unit 500, so that neither excess nor deficiency of coin rolls dispensed from the money handling apparatus 201 occurs.

In the above-described method for dispensing coin rolls from the money handling apparatus 201, money is firstly sent from the storage assembly to the banknote collection cassette 344 or the coin collection cassette 470, whereby the management authority for the money is changed from the management authority of the store to the management authority of the cash-in-transit company. Thereafter, dispensing of coin rolls stored in the coin roll storage tray 540 is performed in the coin roll handling unit 500, whereby the management authority for the coin rolls is changed from the management authority of the cash-in-transit company to the management authority of the store. Furthermore, since coin rolls which have the same monetary amount as money sent from the storage assembly to the banknote collection cassette 344 or the coin collection cassette 470 are dispensed from the coin roll handling unit 500, the monetary amount of money managed under the management authority of the store and the monetary amount of money managed under the management authority of the cash-in-transit company are not changed. Thus, in the present embodiment, dispensing of coin rolls stored in the coin roll storage tray 540 managed under the management authority of the cash-in-transit company can be performed such that the monetary amount of the money managed under the management authority of the store and the monetary amount of the money managed under the management authority of the cash-in-transit company are not changed.

In the money handling apparatus 201 having the above-described configuration, the control unit 210 manages money stored in the denomination-based banknote storage unit 340 or the denomination-based coin storage unit 440 (storage unit) of the storage assembly, under the first management authority (specifically, the management authority of the store), and manages money stored in the banknote collection cassette 344 or the coin collection cassette 470 (collection unit), and money stored in the coin roll storage tray 540 (replenishing unit) of the coin roll handling unit 500, under the second management authority (specifically, the management authority of the cash-in-transit company) different from the first management authority. Thus, the management authority for a replenishing unit (specifically, the coin roll storage tray 540 of the coin roll handling unit 500) in which money for replenishing an external device (specifically, for example, money change machine) is stored, can be made different from the management authority for the storage assembly. Thus, in the money handling apparatus 201 shown in FIG. 8 to FIG. 13, since the management authority for the coin roll storage tray 540 of the coin roll handling unit 500 is different from the management authority (that is, the management authority of a store) for the storage assembly, a guard of a cash-in-transit company is allowed to store coin rolls as change fund delivered to the store, directly in the coin roll storage assembly, and need not deliver the coin rolls as change fund to a clerk or the like of the store, thereby reducing work load on the guard of the cash-in-transit company.

Figure 14:
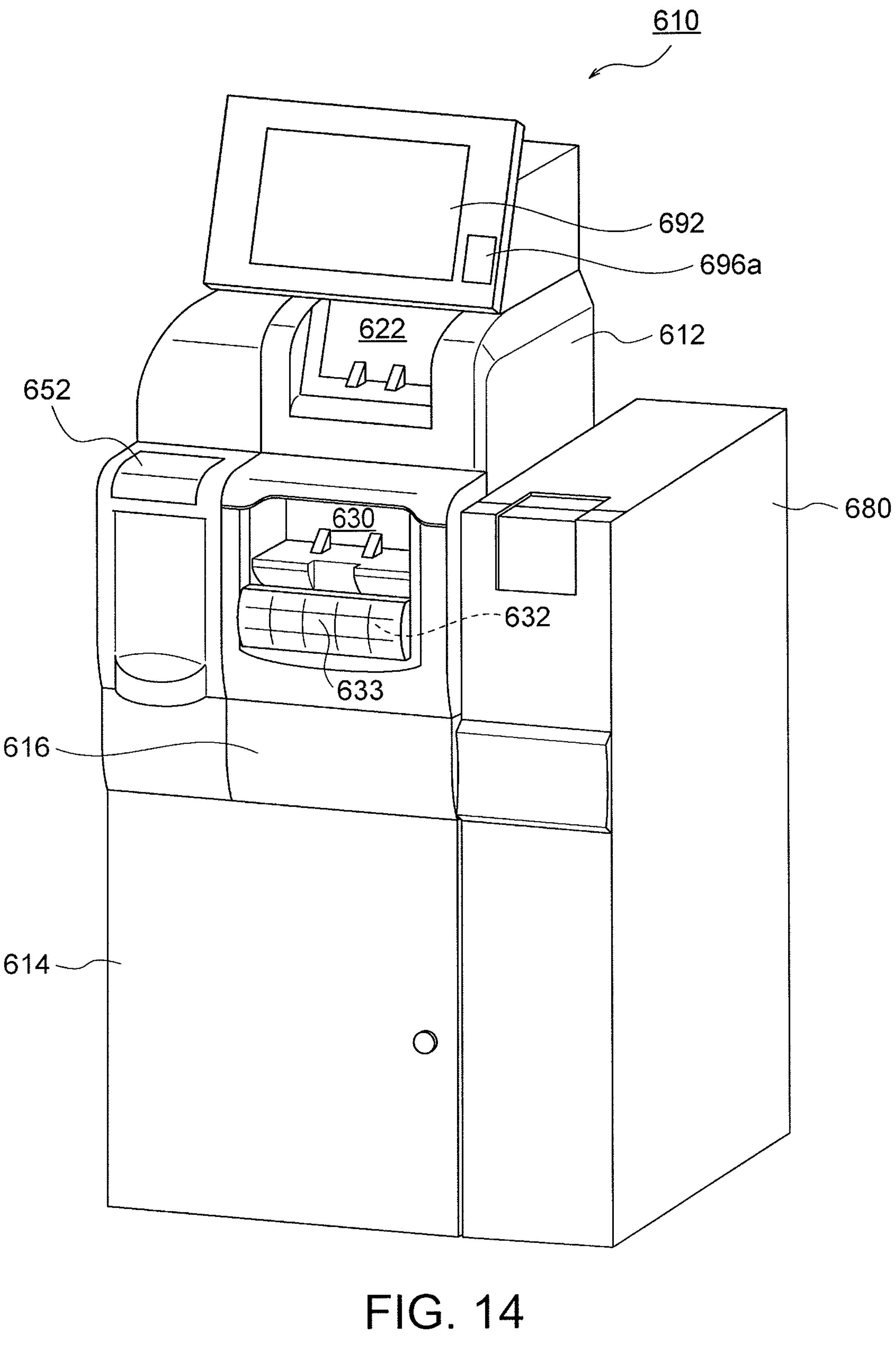
FIG. 14 is a perspective view of an outer appearance of a valuable medium handling apparatus having still another configuration according to an embodiment of the present invention.
Figure 15:
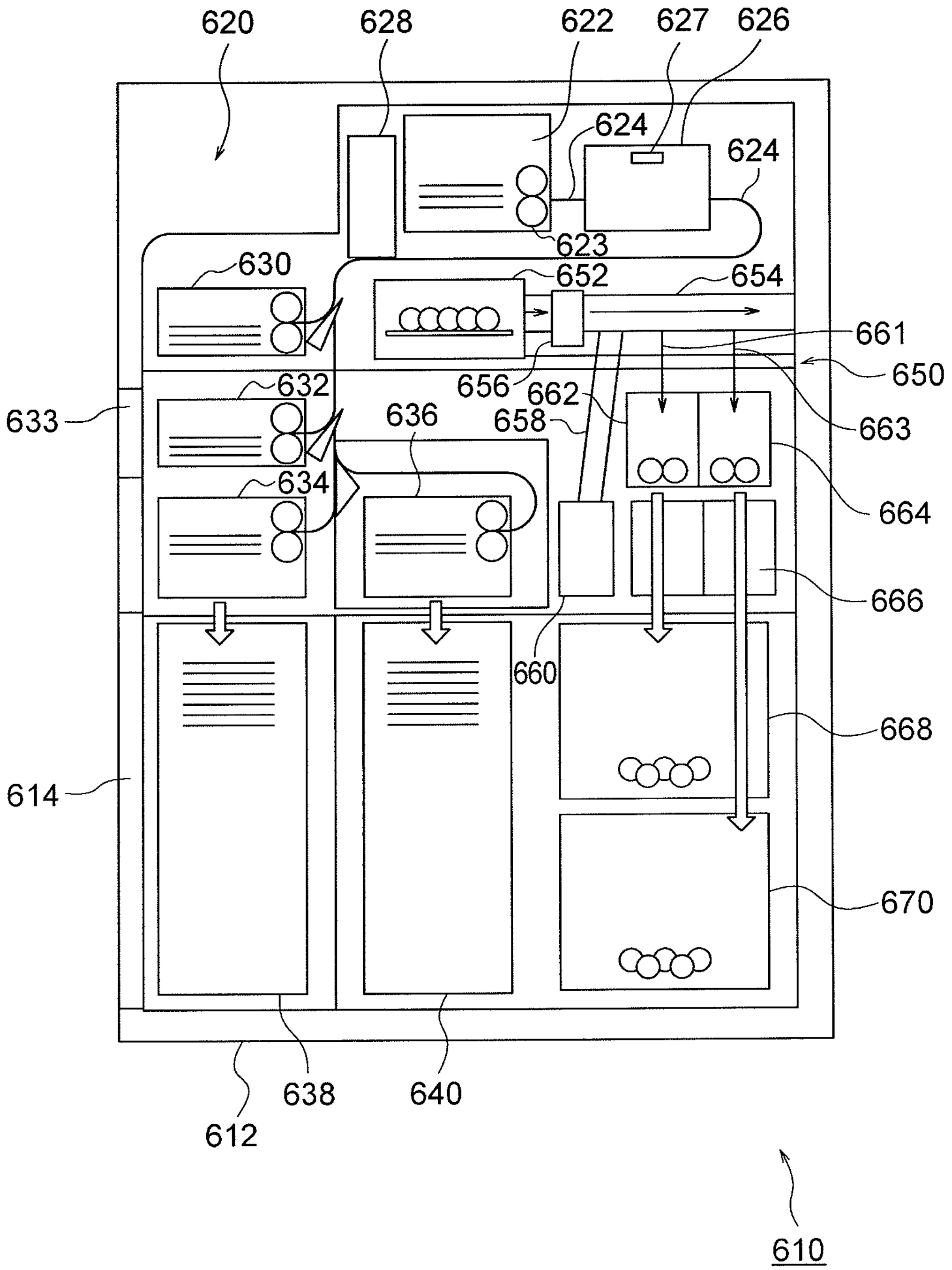
FIG. 15 schematically illustrates an internal structure of the valuable medium handling apparatus shown in FIG. 14.
Figure 16:
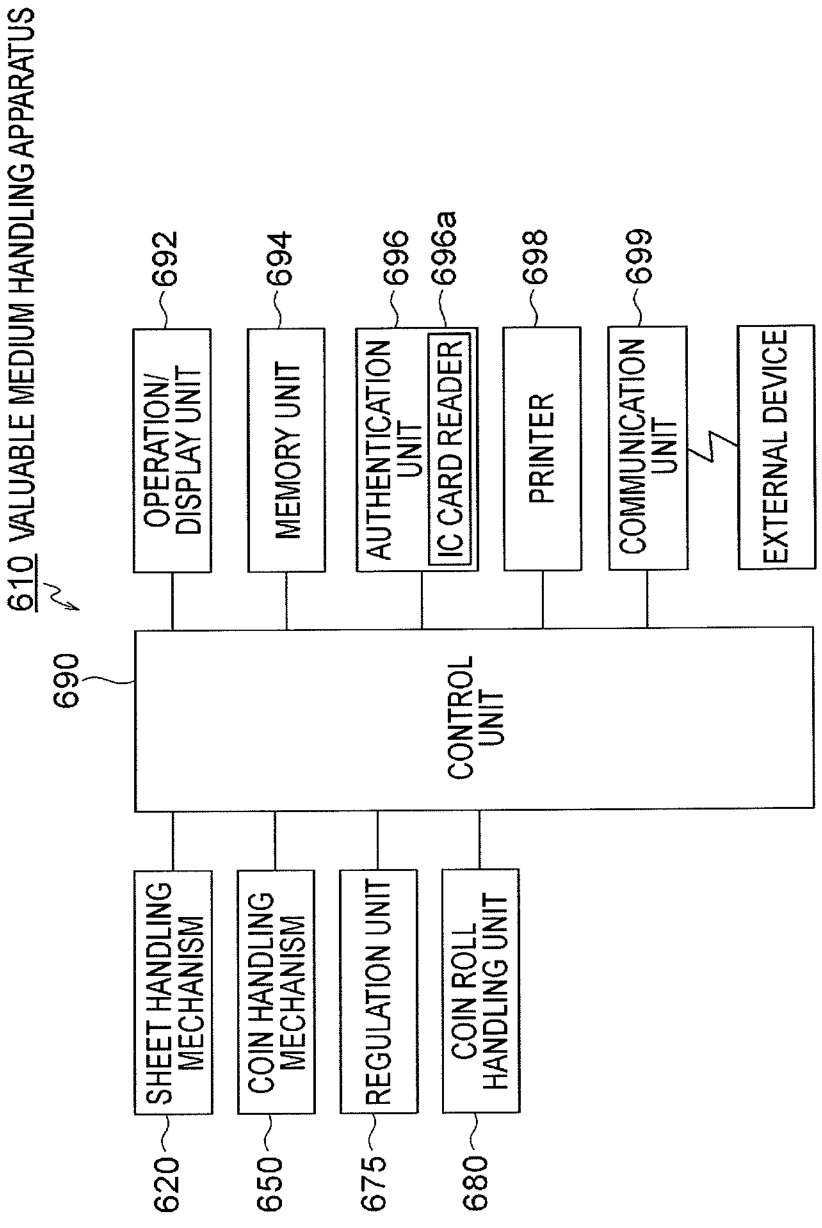
FIG. 16 is a functional block diagram illustrating the valuable medium handling apparatus shown in FIG. 14.
Figure 17:
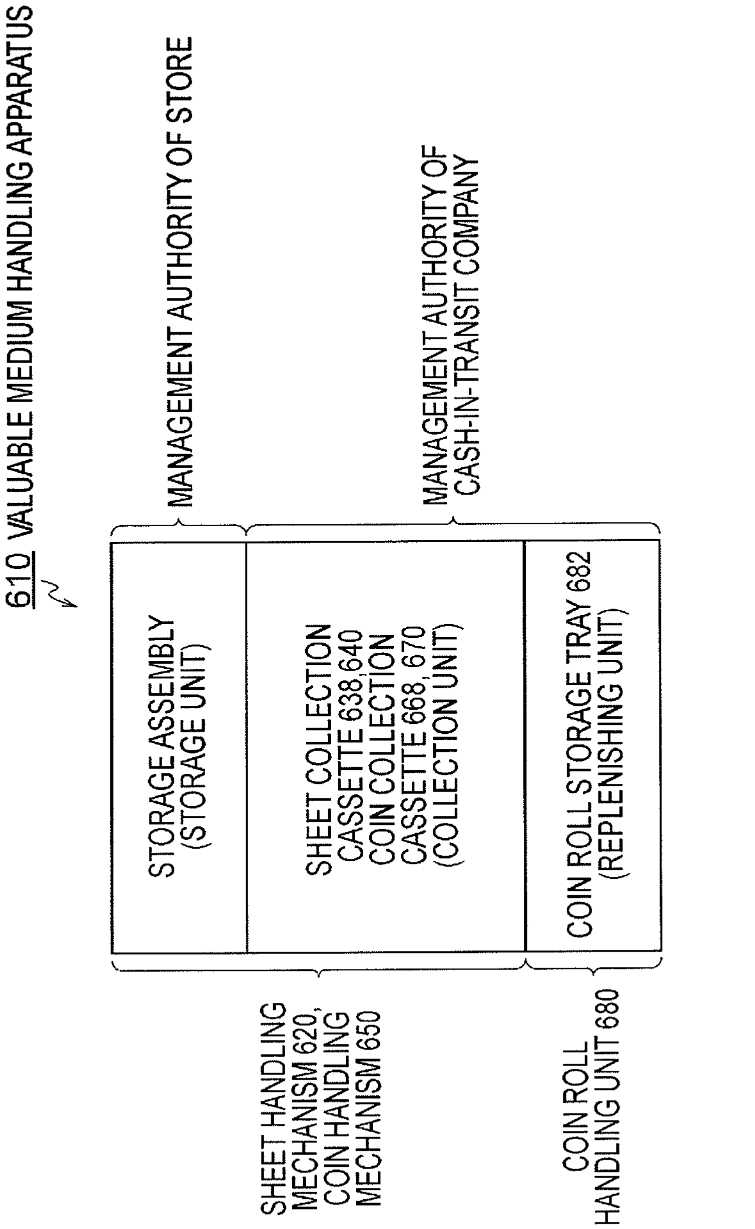
FIG. 17 illustrates management authority for each of a storage assembly, a storage cassette, and a coin roll storage tray of the valuable medium handling apparatus shown in FIG. 14.

As the money handling machine according to the present invention, a valuable medium handling apparatus 610 shown in FIG. 14 to FIG. 17 may be used. FIG. 14 is a perspective view of an outer appearance of the valuable medium handling apparatus 610 having still another configuration of the present embodiment. FIG. 15 illustrates internal structures of a sheet handling mechanism 620 and a coin handling mechanism 650 of the valuable medium handling apparatus 610 shown in FIG. 14, as viewed from the lateral side. FIG. 16 is a functional block diagram illustrating a configuration of a control system of the valuable medium handling apparatus 610 shown in FIG. 14. FIG. 17 illustrates management authority for each of a storage assembly, a sheet collection cassette 638, 640, a coin collection cassette 668, 670 (collection unit), and a coin roll storage tray 682 in the valuable medium handling apparatus 610 shown in FIG. 14.

As shown in FIG. 14 and FIG. 15, the valuable medium handling apparatus 610 of the present embodiment has a housing 612 shaped in an almost rectangular parallelepiped. The sheet handling mechanism 620 for performing handling of sheets such as banknotes and coupons, and the coin handling mechanism 650 for performing handling of coins are disposed in the housing 612. As shown in FIG. 14, at a right side portion in the case of the valuable medium handling apparatus 610 being viewed from the front surface, a sheet inlet unit 622, a reject unit 630, and a shutter 633 for opening and closing an opening at the front surface of a sheet stacking unit 632 (described below) are disposed in order, respectively, starting from the upper side. Furthermore, a coin inlet unit 652 is disposed at the left side portion in the case of the valuable medium handling apparatus 610 being viewed from the front surface. At the upper side portion of the valuable medium handling apparatus 610, for example, an operation/display unit 692 implemented by a touch panel or the like is disposed. At the lower portion on the front surface of the valuable medium handling apparatus 610, a lower door 614 is disposed. When the lower door 614 is opened, the sheet collection cassette 638, 640 (described below) and the coin collection cassette 668, 670 (described below) accommodated in the housing 612 can be drawn from the housing 612 to the outside.

Next, the structures of the sheet handling mechanism 620 and the coin handling mechanism 650 of the valuable medium handling apparatus 610 will be described in detail with reference to FIG. 15. In FIG. 15, the sheet handling mechanism 620 and the coin handling mechanism 650 are schematically illustrated so as to be disposed in the front-rear direction in order to illustrate the structure of the sheet handling mechanism 620 and the structure of the coin handling mechanism 650 on one drawing sheet. As shown in FIG. 15, in the sheet handling mechanism 620, a sheet feeding unit 623 is disposed in the sheet inlet unit 622, and sheets such as banknotes and coupons which are taken in into the sheet inlet unit 622 in a stacked state are fed out one by one into the housing 612 of the valuable medium handling apparatus 610 by the sheet feeding unit 623. Furthermore, a sheet transport unit 624 is connected to the sheet inlet unit 622, and sheets such as banknotes and coupons fed out from the sheet inlet unit 622 by the sheet feeding unit 623 are transported one by one by the sheet transport unit 624. A sheet recognition unit 626 is disposed in the sheet transport unit 624, and the sheet recognition unit 626 recognizes, for example, the kinds and the denominations of sheets such as banknotes and coupons transported by the sheet transport unit 624. More specifically, an image sensor 627 as an imaging unit is disposed in the sheet recognition unit 626, and an image of the surface of the sheet such as a banknote or a coupon is taken by the image sensor 627, to obtain the image data. The sheet recognition unit 626 obtains the serial number of the banknote or the coupon number of the coupon (hereinafter, which will be collectively referred to also as an identification number of a valuable medium) based on the image data, of the banknote or the coupon, which has been taken by the image sensor 627.

Furthermore, a finish-mark printing unit 628 is disposed downward of the sheet recognition unit 626 in the sheet transport unit 624. The finish-mark printing unit 628 is implemented by, for example, an ink jet printer. When a sheet is recognized as a coupon by the sheet recognition unit 626, a predetermined content such as a “finished” mark is printed on the surface of the coupon by the finish-mark printing unit 628. Thus, by the predetermined content being printed on the coupon which has been taken in into the housing 612 of the valuable medium handling apparatus 610 and recognized by the sheet recognition unit 626, an operator can visually confirm that handling of the coupon has been performed by the sheet handling mechanism 620. The content printed on the coupon by the finish-mark printing unit 628 or the position of the printed content can be optionally set. Setting as to whether or not printing by the finish-mark printing unit 628 is to be performed can be made according to the kind of the coupon.

As shown in FIG. 15, the reject unit 630 is connected to the sheet transport unit 624. Among sheets recognized by the sheet recognition unit 626, a banknote recognized as being not a normal banknote or a coupon which is not recognized as a predetermined kind of coupon having been preset is sent as a rejected sheet from the sheet transport unit 624 to the reject unit 630, and stacked in the reject unit 630. An operator is allowed to access the reject unit 630 from the outside of the housing 612 of the valuable medium handling apparatus 610, and the rejected sheets stacked in the reject unit 630 are taken out from the housing 612 to the outside by the operator.

As shown in FIG. 15, the sheet stacking unit 632 is connected to the sheet transport unit 624. Among sheets recognized by the sheet recognition unit 626, a predetermined kind of sheet having been preset is sent from the sheet transport unit 624 to the sheet stacking unit 632 and stacked in the sheet stacking unit 632. As shown in FIG. 14 and FIG. 15, the sheet stacking unit 632 includes the shutter 633 for opening and closing an opening at the front surface of the sheet stacking unit 632, and the operator is allowed to take out the sheets stacked in the sheet stacking unit 632 to the outside of the housing 612 of the valuable medium handling apparatus 610 by the shutter 633 being opened. The opening and closing of the shutter 633 is controlled by a control unit 690 described below. The shutter 633 may not be disposed in the opening at the front surface of the sheet stacking unit 632. In this case, an operator is allowed to always access the sheet stacking unit 632 from the outside of the housing 612 of the valuable medium handling apparatus 610.

As shown in FIG. 15, to the sheet transport unit 624, a first sheet-temporary-storage unit 634 and a second sheet-temporary-storage unit 636 are connected. Among sheets recognized by the sheet recognition unit 626, a predetermined kind of sheet having been preset is sent from the sheet transport unit 624 to the first sheet-temporary-storage unit 634 or the second sheet-temporary-storage unit 636, and temporarily stored in the first sheet-temporary-storage unit 634 or the second sheet-temporary-storage unit 636. Below the first sheet-temporary-storage unit 634, a first sheet collection cassette 638 is disposed. Below the second sheet-temporary-storage unit 636, a second sheet collection cassette 640 is disposed. After sheets are temporarily stored in the first sheet-temporary-storage unit 634 or the second sheet-temporary-storage unit 636, when the control unit 690 (described below) of the valuable medium handling apparatus 610 is provided with an instruction for accepting the depositing, through the operation/display unit 692 (described below), the bottom surface of the first sheet-temporary-storage unit 634 or the second sheet-temporary-storage unit 636 is opened, and the sheets that are temporarily stored in the first sheet-temporary-storage unit 634 or the second sheet-temporary-storage unit 636 are stored in the first sheet collection cassette 638 or the second sheet collection cassette 640. The first sheet collection cassette 638 and the second sheet collection cassette 640 can be removed from the housing 612 of the valuable medium handling apparatus 610. When the first sheet collection cassette 638 or the second sheet collection cassette 640 is removed from the housing 612, sheets stored in the first sheet collection cassette 638 or the second sheet collection cassette 640 can be taken out.

After sheets are temporarily stored in the first sheet-temporary-storage unit 634 or the second sheet-temporary-storage unit 636, when the control unit 690 (described below) of the valuable medium handling apparatus 610 is provided with a return instruction, through the operation/display unit 692 (described below), the sheets that are temporarily stored in the first sheet-temporary-storage unit 634 or the second sheet-temporary-storage unit 636 are returned to the outside of the housing 612 of the valuable medium handling apparatus 610. The first sheet-temporary-storage unit 634 and the second sheet-temporary-storage unit 636 can be drawn forward from the housing 612 of the valuable medium handling apparatus 610 independently of the first sheet collection cassette 638 and the second sheet collection cassette 640. Specifically, as shown in FIG. 14, a door 616 for the temporary storage unit is disposed at the upper right portion of the lower door 614 on the front surface of the valuable medium handling apparatus 610, and, when sheets that are temporarily stored in the first sheet-temporary-storage unit 634 are collected, the door 616 for the temporary storage unit is opened to allow the sheets temporarily stored in the first sheet-temporary-storage unit 634 to be taken out. Meanwhile, when sheets that are temporarily stored in the second sheet-temporary-storage unit 636 are collected, the door 616 for the temporary storage unit is opened and the first sheet-temporary-storage unit 634 and the second sheet-temporary-storage unit 636 are drawn forward from the housing 612, whereby the temporarily stored sheets can be taken out from the upper surface of the second sheet-temporary-storage unit 636.

Next, the structure of the coin handling mechanism 650 will be described below. As shown in FIG. 14 and FIG. 15, the coin inlet unit 652 including, for example, a hopper is disposed in the coin handling mechanism 650. A coin transport unit 654 is connected to the coin inlet unit 652. Coins taken in into the coin inlet unit 652 are transported one by one by the coin transport unit 654 in a state where the coins are arranged in one layer in one line. A coin recognition unit 656 is disposed in the coin transport unit 654, and coins transported by the coin transport unit 654 are recognized for the authenticity, denominations, and the like by the coin recognition unit 656.

On the side downstream of the coin recognition unit 656 in the coin transporting direction, a coin reject opening and two diverting openings are formed in the transport surface of the coin transport unit 654. Solenoid-equipped selection members (not shown) are disposed in the coin reject opening and each diverting opening, respectively. Coins transported by the coin transport unit 654 are selectively taken in into the coin reject opening or each diverting opening by each solenoid-equipped selection member, and are sent from the coin transport unit 654.

As shown in FIG. 15, a coin reject unit 660 is disposed below the coin reject opening in the coin transport unit 654 so as to interpose a coin reject chute 658 between the coin reject unit 660 and the coin reject opening. Among coins recognized by the coin recognition unit 656, a rejected coin that is not a normal coin is sent from the coin transport unit 654 through the coin reject opening, is sent to the coin reject chute 658, and is sent to the coin reject unit 660 by the coin reject chute 658. The coin reject unit 660 having such a structure can be taken out to the outside of the housing 612 of the valuable medium handling apparatus 610, and an operator takes out the rejected coins from the coin reject unit 660 after the coin reject unit 660 has been taken out to the outside of the housing 612.

A first coin-temporary-storage unit 662 and a second coin-temporary-storage unit 664 are disposed below two diverging openings disposed in the coin transport unit 654 so as to interpose a first coin transport chute 661 and a second coin transport chute 663, respectively, between: the two diverging openings; and the first coin-temporary-storage unit 662 and the second coin-temporary-storage unit 664. A predetermined denomination of coins are sent from the coin transport unit 654 through the diverging openings into the first coin transport chute 661 or the second coin transport chute 663, and are temporarily stored in the first coin-temporary-storage unit 662 or the second coin-temporary-storage unit 664. The first coin-temporary-storage unit 662 and the second coin-temporary-storage unit 664 each include a frame body having an upper portion and a lower portion which are opened, and a bottom plate for selectively closing the lower opening of the frame body. In a state where the lower opening of the frame body is closed by the bottom plate, coins are temporarily stored in the first coin-temporary-storage unit 662 or the second coin-temporary-storage unit 664.

As shown in FIG. 15, below the first coin-temporary-storage unit 662 and the second coin-temporary-storage unit 664, a coin return box 666, a first coin collection cassette 668, and a second coin collection cassette 670 are disposed. The coins that are temporarily stored in the first coin-temporary-storage unit 662 or the second coin-temporary-storage unit 664 are sent to one of the coin return box 666, the first coin collection cassette 668, and the second coin collection cassette 670. Coins that are temporarily stored in the first coin-temporary-storage unit 662 are sent to the first coin collection cassette 668. Coins that are temporarily stored in the second coin-temporary-storage unit 664 are sent to the second coin collection cassette 670. The coin return box 666 is sectioned into two regions. After coins are temporarily stored in the first coin-temporary-storage unit 662 or the second coin-temporary-storage unit 664, when the control unit 690 (described below) of the valuable medium handling apparatus 610 is provided, through the operation/display unit 692 (described below), with an instruction for accepting the depositing, the frame body of the first coin-temporary-storage unit 662 or the second coin-temporary-storage unit 664 is horizontally moved, and the coins in the frame body are stored in the first coin collection cassette 668 or the second coin collection cassette 670. The first coin collection cassette 668 or the second coin collection cassette 670 can be removed from the housing 612 of the valuable medium handling apparatus 610. By the first coin collection cassette 668 or the second coin collection cassette 670 being removed from the housing 612, coins stored in the first coin collection cassette 668 or the second coin collection cassette 670 can be taken out.

After coins are temporarily stored in the first coin-temporary-storage unit 662 or the second coin-temporary-storage unit 664, when the control unit 690 (described below) of the valuable medium handling apparatus 610 is provided with a return instruction through the operation/display unit 692 (described below), the bottom plate of the first coin-temporary-storage unit 662 or the second coin-temporary-storage unit 664 is horizontally moved to open the lower opening of the frame body, whereby coins in the frame body are stored in the coin return box 666. As described above, the coin return box 666 is sectioned into two regions, and coins sent from the first coin-temporary-storage unit 662 and the second coin-temporary-storage unit 664 are stored in the two sectioned regions, respectively. The coin return box 666 can be drawn forward from the housing 612 of the valuable medium handling apparatus 610. By the coin return box 666 being drawn forward from the housing 612, an operator is allowed to take out the returned coins from the coin return box 666.

In the present embodiment, a regulation unit 675 (see FIG. 16) regulates access to each valuable medium storage unit that includes the sheet stacking unit 632, the first sheet collection cassette 638, the second sheet collection cassette 640, the first coin collection cassette 668, and the second coin collection cassette 670, for each valuable medium storage unit. More specifically, for the sheet collection cassette 638, 640 and the coin collection cassette 668, 670, a cassette locking unit (not shown) is disposed so as to correspond to each storage cassette, and the cassette locking unit selectively locks the storage cassette into the housing 612 of the valuable medium handling apparatus 610 such that the storage cassette cannot be taken out. When locking by the regulation unit 675 is cancelled, for example, an operation of taking out only the first sheet collection cassette 638 from the housing 612 of the valuable medium handling apparatus 610, or an operation of collectively taking out the first sheet collection cassette 638, the second sheet collection cassette 640, the first coin collection cassette 668, and the second coin collection cassette 670, from the housing 612 of the valuable medium handling apparatus 610, can be selectively performed.

In the present embodiment, access to the sheet stacking unit 632 can be selectively regulated by the above-described regulation unit 675. Specifically, the regulation unit 675 selectively regulates opening and closing of the shutter 633 for opening and closing the front surface opening of the sheet stacking unit 632. In this case, when the front surface opening is closed by the shutter 633, an operator is not allowed to take out sheets from the sheet stacking unit 632 to the outside of the housing 612, whereas, when the shutter 633 operates to open the front surface opening of the sheet stacking unit 632, an operator is allowed to take out sheets from the sheet stacking unit 632 to the outside of the housing 612.

In the present embodiment, when the sheet inlet unit 622, the sheet feeding unit 623, the sheet transport unit 624, the sheet recognition unit 626, the reject unit 630, the sheet stacking unit 632, the first sheet-temporary-storage unit 634, and the second sheet-temporary-storage unit 636 of the sheet handling mechanism 620, and the coin inlet unit 652, the coin transport unit 654, the coin recognition unit 656, the coin reject unit 660, the first coin-temporary-storage unit 662, and the second coin-temporary-storage unit 664 of the coin handling mechanism 650 are combined with each other, the storage assembly capable of storing banknotes and coins deposited into the housing 612 from the outside and dispensing stored banknotes and coins from the housing 612 to the outside is structured (see FIG. 17).

In the valuable medium handling apparatus 610 of the present embodiment, a coin roll handling unit 680 is aligned next to the housing 612 in which the sheet handling mechanism 620 and the coin handling mechanism 650 are accommodated. The structure of the coin roll handling unit 680 is almost the same as the structure of the coin roll handling unit 500 of the money handling apparatus 201 shown in FIG. 8 to FIG. 13. Specifically, the coin roll handling unit 680 has a plurality of coin roll storage trays 682 (see FIG. 17) that store coin rolls. The structure of the coin roll storage tray 682 is almost the same as the structure of the coin roll storage tray 540 of the coin roll handling unit 500 shown in FIG. 8 to FIG. 13. Detailed description of the structure of the coin roll handling unit 680 is omitted.

As shown in FIG. 16, in the valuable medium handling apparatus 610 of the present embodiment, the control unit 690 that controls each component of the valuable medium handling apparatus 610 is disposed. More specifically, to the control unit 690, the sheet handling mechanism 620, the coin handling mechanism 650, the regulation unit 675, the coin roll handling unit 680, and the like are connected. The control unit 690 sends instruction signals to the components to control the components. As described above, the operation/display unit 692 implemented by, for example, a touch panel is disposed in the upper portion of the valuable medium handling apparatus 610. The operation/display unit 692 is also connected to the control unit 690. Thus, the operation/display unit 692 allows an operator to provide the control unit 690 with various instructions, or allows the control unit 690 to control the contents to be displayed on the operation/display unit 692. On the operation/display unit 692, for example, operation guidance, transaction data in depositing, or data of, for example, inventory amounts of money and coupons stored in each collection cassette 638, 640, 668, 670 and the sheet stacking unit 632 is displayed.

A memory unit 694 is connected to the control unit 690. In the memory unit 694, transaction data in depositing, and data of, for example, inventory amounts of money and coupons stored in each collection cassette 638, 640, 668, 670 and the sheet stacking unit 632 are stored. In the present embodiment, for the valuable medium such as a banknote and a coupon deposited into the housing 612 by the sheet inlet unit 622 and recognized by the sheet recognition unit 626, the control unit 690 causes the memory unit 694 to store the identification number (specifically, the serial number of the banknote, the coupon number of the coupon) of the valuable medium obtained based on the image data of the valuable medium which is obtained by the image sensor 627 in the sheet recognition unit 626.

The control unit 690 includes an authentication unit 696 for performing authentication of the management authority of an operator. The authentication unit 696 is disposed, for example, on the right side of the operation/display unit 692 at the upper portion of the valuable medium handling apparatus 610, and is implemented by an IC card reader 696*a* (see FIG. 14) for reading an IC card of an operator. By an IC card of the operator being read by the IC card reader

696*a*, whether the management authority of the operator is management authority of a store or management authority of a cash-in-transit company is determined. As the authentication unit 696, a magnetic card reader for reading a magnetic card of an operator may be used instead of the IC card reader 696*a*. Instead of an operator causing the IC card reader 696*a* to read an IC card, the operator may input an identification number or a password of the operator through the operation/display unit 692, a keyboard or the like (not shown) which is separately disposed, and the authentication unit 696 may perform authentication of the management authority of the operator based on the inputted identification number or password of the operator. The authentication unit 696 may perform biometric authentication so as to check a fingerprint or retina of the operator.

A printer 698 is connected to the control unit 690. By the printer 698, for example, transaction data in depositing, and data of, for example, inventory amounts of money and coupons stored in each collection cassette 638, 640, 668, 670 and the sheet stacking unit 632 when closing or collecting is performed by the valuable medium handling apparatus 610 are printed.

A communication unit 699 is connected to the control unit 690. The communication unit 699 allows the control unit 690 of the valuable medium handling apparatus 610 to transmit a signal to and receive a signal from an external device such as a higher-order device. Specifically, transaction data in depositing in the valuable medium handling apparatus 610 is transmitted via the communication unit 699 to the external device, and various setting information for the valuable medium handling apparatus 610, or the like is received from the external device through the communication unit 699.

Next, management authority under which each of money in the storage assembly of the sheet handling mechanism 620 or the coin handling mechanism 650, money collected in the sheet collection cassette 638, 640 or the coin collection cassette 668, 670, and money stored in the coin roll storage tray 682 of the coin roll handling unit 680 in the valuable medium handling apparatus 610 shown in FIG. 14 to FIG. 16 is to be managed, will be described with reference to FIG. 17. In the present embodiment, the management authority for managing money in the valuable medium handling apparatus 610 includes two management authorities which are management authority (first management authority) of the store and management authority (second management authority) of the cash-in-transit company. Only an operator who has the management authority is allowed in general to access each of money in the storage assembly of each of the sheet handling mechanism 620 and the coin handling mechanism 650, money collected in the sheet collection cassette 638, 640 and the coin collection cassette 668, 670, and money stored in the coin roll storage tray 682 of the coin roll handling unit 680. In the present embodiment, as shown in FIG. 17, as the management authority for money in the storage assembly of each of the sheet handling mechanism 620 and the coin handling mechanism 650, the management authority of a facility (specifically, store) in which the valuable medium handling apparatus 610 is installed, is allocated. Meanwhile, as the management authority for money collected in the sheet collection cassette 638, 640 and the coin collection cassette 668, 670, and money (specifically, coin rolls) stored in the coin roll storage tray 682 of the coin roll handling unit 680, the management authority of an organization (specifically, cash-in-transit company) which collects money from the store by using the sheet collection cassette 638, 640 and the coin collection cassette 668, 670, is allocated. As described below, in the present embodiment, only an operator (for example, store manager or the like) who has a specific authority of the store is allowed to dispense coin rolls stored in the coin roll storage tray 682 of the coin roll handling unit 680, to the outside of the coin roll handling unit 680. Meanwhile, even the operator who has the specific authority in the store is not allowed to take out money collected in the sheet collection cassette 638, 640 and the coin collection cassette 668, 670, to the outside, from the housing 612 of the valuable medium handling apparatus 610.

Next, an operation performed by a guard of a cash-in-transit company for replenishing the valuable medium handling apparatus 610 of the present embodiment with money (specifically, coin rolls), and collecting money as proceeds from sales, from the valuable medium handling apparatus 610, will be described. Firstly, the guard of the cash-in-transit company conveys money (specifically, coin rolls) as change fund to be used in a money change machine, to the store, from the management center of the cash-in-transit company. Next, the guard causes the IC card reader 696*a* to read his/her IC card, thereby causing the authentication unit 696 to perform authentication of the guard. Instead of the guard causing the IC card reader 696*a* to read his/her IC card to perform authentication of the guard, the guard may input his/her identification number and password through the operation/display unit 692, whereby the authentication unit 696 may perform authentication of the guard. When the authentication unit 696 has performed authentication of the guard, locking of each sheet collection cassette 638, 640 and each coin collection cassette 668, 670 by the regulation unit 675 is canceled, and the sheet collection cassette 638, 640 and the coin collection cassette 668, 670 can be taken out from the housing 612 to the outside. Thus, the guard is allowed to take out each sheet collection cassette 638, 640 and each coin collection cassette 668, 670 from the housing 612, and collect money stored in the sheet collection cassette 638, 640 and the coin collection cassette 668, 670 together with the sheet collection cassette 638, 640 and the coin collection cassette 668, 670. Furthermore, when the authentication unit 696 has performed authentication of the guard, an opening and closing door disposed on the rear surface side of the coin roll handling unit 680 is opened, whereby the guard is allowed to replenish each coin roll storage tray 682 with coin rolls. Thus, in the present embodiment, money collected in each sheet collection cassette 638, 640 and each coin collection cassette 668, 670, and coin rolls stored in the coin roll storage tray 682 of the coin roll handling unit 680 are managed under the management authority of the cash-in-transit company. Therefore, the guard of the cash-in-transit company is allowed to take out each sheet collection cassette 638, 640 and each coin collection cassette 668, 670 from the housing 612, and collect money stored in the sheet collection cassette 638, 640 and the coin collection cassette 668, 670, and replenish the coin roll storage tray 682 of the coin roll handling unit 680 with coin rolls. In particular, the guard of the cash-in-transit company is allowed to directly replenish the coin roll storage tray 682 of the coin roll handling unit 680, with coin rolls for replenishing the coin roll storage tray 682 of the coin roll handling unit 680, without delivering the coin rolls to a clerk or the like of the store. Accordingly, even when a clerk or the like of the store is absent, the coin roll storage tray 682 can be replenished with coin rolls, thereby enhancing convenience for the guard.

Next, an operation performed, by an operator such as a store manager of the store who has a predetermined authority, for taking out money (specifically, coin rolls) from the valuable medium handling apparatus 610 in order to replenish a money change machine with money as change fund, will be described below.

When a manager (for example, store manager or the like) who has a predetermined authority in the store takes out coin rolls from the valuable medium handling apparatus 610, the store manager or the like firstly causes the IC card reader 696*a* to read her/his IC card, whereby the authentication unit 696 performs authentication of the store manager or the like. Instead of the store manager or the like causing the IC card reader 696*a* to read her/his IC card to perform authentication of the store manager or the like, the store manager or the like may input her/his identification number and password through the operation/display unit 692, whereby the authentication unit 696 may perform authentication of the store manager or the like. In the present embodiment, since coin rolls stored in the coin roll storage tray 682 of the coin roll handling unit 680 are managed under the management authority of the cash-in-transit company, an ordinary clerk who does not have the predetermined authority in the store is not allowed to perform dispensing of coin rolls stored in the coin roll storage tray 682 in the coin roll handling unit 680, and only the operator such as the store manager who has the predetermined authority is allowed to perform dispensing of coin rolls stored in the coin roll storage tray 682 in the coin roll handling unit 680. After the authentication unit 696 has performed authentication of the store manager or the like, the store manager or the like inputs the number of coin rolls, for each denomination, required as change fund in a money change machine, by using the operation/display unit 692. Thereafter, money is delivered from the storage assembly to the sheet collection cassette 638, 640 or the coin collection cassette 668, 670 in the sheet handling mechanism 620 or the coin handling mechanism 650. More specifically, money which has the same monetary amount as the number of coin rolls, for each denomination, which has been inputted by the store manager or the like using the operation/display unit 692 is sent from the storage assembly to the sheet collection cassette 638, 640 or the coin collection cassette 668, 670.

Specifically, when money is delivered from the storage assembly to the sheet collection cassette 638, 640 or the coin collection cassette 668, 670, the store manager or the like deposits money into the sheet inlet unit 622 or the coin inlet unit 652, and the money deposited into the housing 612 by the sheet inlet unit 622 or the coin inlet unit 652 is sent to the sheet collection cassette 638, 640 or the coin collection cassette 668, 670.

When money which has the same monetary amount as the number of coin rolls, for each denomination, which has been received by the control unit 690 is sent from the storage assembly to the sheet collection cassette 638, 640 or the coin collection cassette 668, 670, dispensing of the coin rolls stored in the coin roll storage tray 682 is performed in the coin roll handling unit 680. The shutter for closing the coin roll outlet is opened. Thus, the store manager or the like is allowed to take out coin rolls from the coin roll transport box. When coin rolls have been taken out from the coin roll transport box, and the coin roll outlet is closed by the shutter, an operation performed, by the store manager or the like of the store, for taking out coin rolls from the valuable medium handling apparatus 610 is completed. In the valuable medium handling apparatus 610 shown in FIG. 14 to FIG. 17, similarly to the money handling apparatus 201 shown in FIG. 8 to FIG. 13, coin rolls are automatically dispensed from the coin roll handling unit 680. Therefore, neither excess nor deficiency of coin rolls dispensed from the valuable medium handling apparatus 610 occurs.

Thus, in the above-described method for dispensing coin rolls from the valuable medium handling apparatus 610, money is firstly sent from the storage assembly to the sheet collection cassette 638, 640 or the coin collection cassette 668, 670, and the management authority of the money is thus changed from the management authority of the store to the management authority of the cash-in-transit company, and dispensing of coin rolls stored in the coin roll storage tray 682 in the coin roll handling unit 680 is thereafter performed, whereby the management authority of the coin rolls is changed from the management authority of the cash-in-transit company to the management authority of the store. Coin rolls which have the same monetary amount as money sent from the storage assembly to the sheet collection cassette 638, 640 or the coin collection cassette 668, 670 are dispensed from the coin roll handling unit 680. Therefore, the monetary amount of money managed under the management authority of the store, and the monetary amount of the money managed under the management authority of the cash-in-transit company are not changed. Thus, in the present embodiment, dispending of coin rolls stored in the coin roll storage tray 682 managed under the management authority of the cash-in-transit company can be performed such that the monetary amount of money managed under the management authority of the store and the monetary amount of money managed under the management authority of the cash-in-transit company are not changed.

In the valuable medium handling apparatus 610 having the above-described configuration, the control unit 690 manages money in the storage assembly of each of the sheet handling mechanism 620 and the coin handling mechanism 650 under the first management authority (specifically, management authority of the store), and manages money stored in each sheet collection cassette 638, 640 and each coin collection cassette 668, 670 (collection unit) and money stored in the coin roll storage tray 682 (replenishing unit) of the coin roll handling unit 680 under the second management authority (specifically, management authority of the cash-in-transit company) different from the first management authority. Thus, the management authority for the replenishing unit (specifically, the coin roll storage tray 682 of the coin roll handling unit 680) in which money for replenishing in an external device (specifically, for example, money change machine) is stored can be made different from the management authority for the storage assembly. Thus, in the valuable medium handling apparatus 610 shown in FIG. 14 to FIG. 17, the management authority for the coin roll storage tray 682 of the coin roll handling unit 680 is different from the management authority (that is, management authority of the store) of the storage assembly. Therefore, the guard of the cash-in-transit company is allowed to store coin rolls as change fund delivered to the store, directly in the coin roll storage assembly. Thus, the guard need not deliver the coin rolls as change fund to a clerk or the like of the store, so that work load on the guard of the cash-in-transit company can be reduced.

What is claimed is:

1. A money handling machine comprising:

a housing;

a receptacle unit configured to take in money including banknotes and coins into the housing from outside of the money handing machine;

a storage assembly configured to store, therein, the money taken in from the receptacle unit and feed out the stored money therefrom;

a collection cassette configured to store the money fed out from the storage assembly;

a coin roll storage unit configured to store coin rolls taken in from outside of the money handling machine, the coin roll storage unit having a locking mechanism for locking the coin roll storage unit into the housing, the coin rolls each formed by wrapping a predetermined number of coins for each denomination with a wrapping sheet;

a control unit configured to control components of the money handling machine;

a detection unit configured to detect a monetary amount of the coin rolls taken out from the coin roll storage unit, and transmit the detected monetary amount to the control unit; and an input unit configured to input, to the control unit, a coin-roll number of a denomination corresponding to a number of coin rolls of the denomination required as change fund, wherein the money handling machine is configured to perform an operation in which:

first, the control unit receives, from the input unit, the coin-roll number of the denomination corresponding to the number of coin rolls of the denomination required as change fund, second, money of a monetary amount corresponding to the coin-roll number of the denomination received by the control unit out of the money stored in the storage assembly is transported from the storage assembly to the collection cassette, third, the locking mechanism releases the locking of the coin roll storage unit, fourth, the control unit compares the monetary amount of the money transported from the storage assembly to the collection cassette, and the monetary amount of the coin rolls detected by the detection unit, with each other when the coin rolls corresponding to the coin-roll number of the denomination received by the control unit are taken out from the coin roll storage unit, and fifth, the locking mechanism locks the coin roll storage unit into the housing when both of the monetary amounts are same monetary amounts as indicated by a comparison result of the control unit.

2. The money handling machine according to claim 1, wherein, when the locking mechanism releases the locking of the coin roll storage unit, the control unit controls the money handling machine so as to allow the coin rolls corresponding to the coin-roll number of the denomination received by the control unit to be take out from the coin roll storage unit.

3. The money handling machine according to claim 1, further comprising a notification unit configured to make notification that the monetary amount of the money transported from the storage assembly to the collection cassette, and the monetary amount of the coin rolls detected by the detection unit are not the same monetary amount as indicated by the comparison result of the control unit.

4. The money handling machine according to claim 1, wherein when the monetary amount of the money transported from the storage assembly to the collection cassette, and the monetary amount of the coin rolls detected by the detection unit are not the same monetary amount as indicated by the comparison result of the control unit, the control unit controls the locking mechanism so as to prevent the coin roll storage unit from being locked by the locking mechanism.

5. The money handling machine according to claim 1, wherein the collection cassette is configured to be mounted to the housing and detachable from the housing to outside of the housing, and the coin roll storage unit is configured to be mounted to the housing and drawable from the housing to the outside of the housing.

6. The money handling machine according to claim 1, wherein a first operator having a first management authority is allowed to access the money which is stored in the storage assembly; and a second operator having a second management authority is allowed to access the money which is stored in the collection cassette, wherein the money handling machine further comprises:

a recognition unit configured to recognize an operator operating the money handling machine and having a management authority as one of the first operator having the first management authority and the second operator having the second management authority by recognition information that the operator has; wherein the operator recognized as the first operator input the coin-roll number to the input unit.

7. The money handling machine according to claim 6, wherein the first operator having the first management authority belongs to a facility in which the money handling machine is installed, and the second operator having the second management authority belongs to an organization that collects the money stored in the collection cassette from the collection cassette.

8. The money handling machine according to claim 6, wherein the recognition unit is configured to read the recognition information stored in a recognition medium for recognizing the money management authority by the recognition unit, when the recognition unit recognizes the operator as the first operator having the first management authority by reading the recognition information stored in the recognition medium, the control unit is configured to control the locking mechanism so as not to release the locking by the locking mechanism, and when the recognition unit recognizes the operator as the second operator having the second management authority by reading the recognition information stored in the recognition medium, the control unit controls the locking mechanism so as to release the locking by the locking mechanism.

9. The money handling machine according to claim 1, wherein the locking mechanism is configured to lock the coin roll storage unit into the housing when both of the monetary amounts are the same monetary amounts as indicated by the comparison result of the control unit and the coin roll storage unit is returned into the housing.

10. The money handling machine according to claim 1, wherein the locking mechanism is configured to be unable to perform locking of the coin roll storage unit in the housing when both of the monetary amounts are not the same monetary amounts as indicated by the comparison result of the control unit.

11. The money handling machine according to claim 1, wherein the detection unit includes a weight measurement unit configured to measure weight of coin rolls, wherein the detection unit is configured to detect the monetary amount of the coin rolls taken out from the coin roll storage unit, based on the weight of the coin rolls measured by a weight measurement unit.

12. The money handling machine according to claim 1, wherein the input unit includes operation keys to receive the input, from a user, of the coin-roll number of the denomination.

* * * * *